(12) United States Patent
Nino

(10) Patent No.: US 7,973,964 B2
(45) Date of Patent: Jul. 5, 2011

(54) PRINTING PROGRAM THAT ADJUSTS ANNOTATION LOCATION AND SIZE

(75) Inventor: Kenji Nino, Osaka (JP)

(73) Assignee: Kyocera Mita Corporation (JP)

( * ) Notice: Subject to any disclaimer, the term of this patent is extended or adjusted under 35 U.S.C. 154(b) by 842 days.

(21) Appl. No.: 12/014,143

(22) Filed: Jan. 15, 2008

(65) Prior Publication Data

US 2008/0170264 A1 Jul. 17, 2008

(30) Foreign Application Priority Data

Jan. 16, 2007 (JP) ................................. 2007-006964
Jan. 16, 2007 (JP) ................................. 2007-006965
Jan. 16, 2007 (JP) ................................. 2007-006966

(51) Int. Cl.
*G06K 15/00* (2006.01)
*G06K 9/34* (2006.01)
*H04N 1/46* (2006.01)

(52) U.S. Cl. ....... 358/1.18; 358/537; 358/538; 382/178; 715/230; 715/231; 715/232

(58) Field of Classification Search ................. 358/1.18, 358/537, 538; 715/230, 231, 232, 233; 382/178
See application file for complete search history.

(56) References Cited

U.S. PATENT DOCUMENTS

| | | | | |
|---|---|---|---|---|
| 6,584,479 | B2 * | 6/2003 | Chang et al. | 715/205 |
| 2004/0194021 | A1 * | 9/2004 | Marshall et al. | 715/512 |
| 2006/0262336 | A1 * | 11/2006 | Venkatachalam et al. | 358/1.13 |
| 2010/0325527 | A1 * | 12/2010 | Estrada et al. | 715/230 |

FOREIGN PATENT DOCUMENTS

| | | |
|---|---|---|
| JP | 9-319805 | 12/1997 |
| JP | 2002-73595 | 3/2002 |

* cited by examiner

*Primary Examiner* — Twyler L Haskins
*Assistant Examiner* — Fred Guillermety
(74) *Attorney, Agent, or Firm* — Gerald E. Hespos; Michael J. Porco

(57) ABSTRACT

A computer-readable recording medium recorded with a printing program causes a processor of a computer to calculate a rendering area of print data stored in a storing section of the computer as a primary area based on the print data, and to calculate a rendering area of commentary string data to be attached to the print data as a sub-area. The program then judges whether the primary area and the sub-area overlap, and whether the sub-area deviates from an effective printing area. The commentary string data can be changed so that the primary area and the sub-area do not overlap, and so that the entire sub-area is within the effective printing area, if at least one of the judgment results in the judging step is affirmative. The changed commentary string data then is attached to the print data.

18 Claims, 18 Drawing Sheets

FIG. 13A
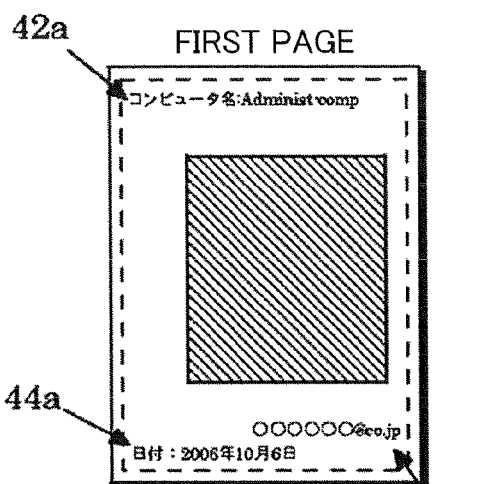
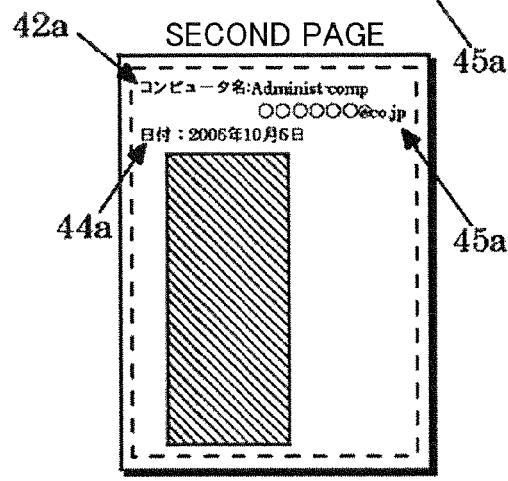
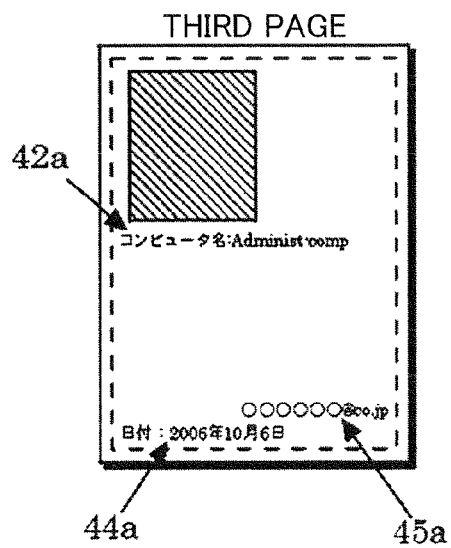
FIG. 13B
RENDERING AREA TO BE
OBTAINED IN ALL PAGES
(HATCHED AREA)
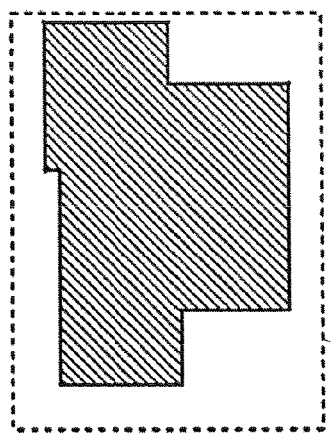

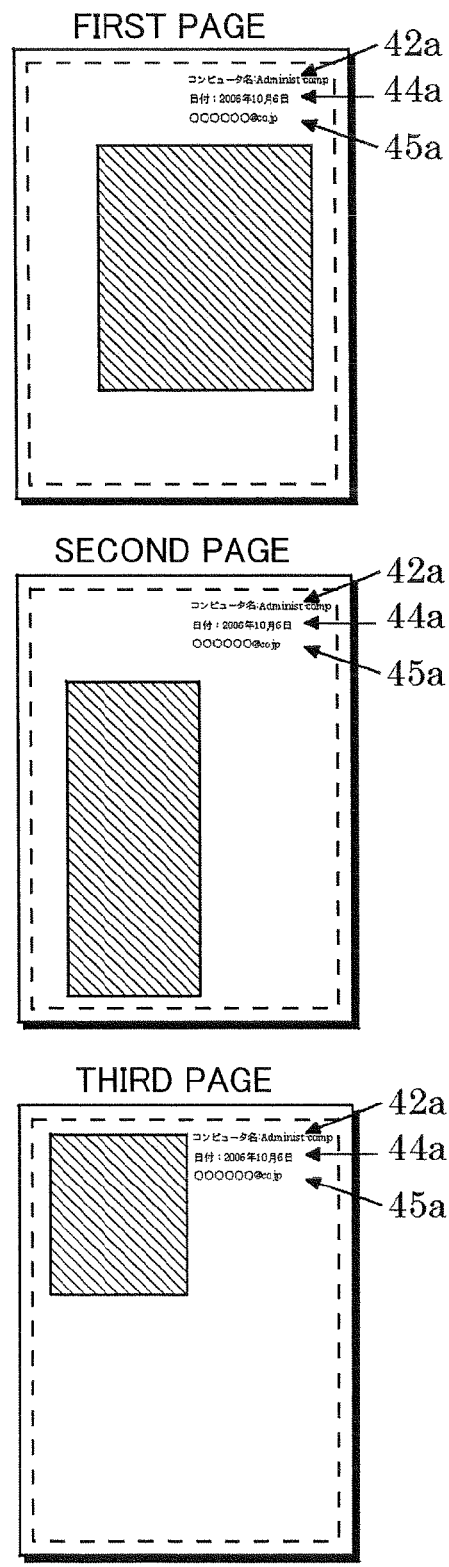

FIG. 15

HEADER/FOOTER PRINTING — 40a

200 — ☑ INTEGRATE HEADER/FOOTER POSITION IN ALL PAGES

- PRINT USER NAME — 41 ▶ NO
- PRINT COMPUTER NAME — 42 ▶ UPPER LEFT
- PRINT PAGE NUMBER — 43 ▶ NO
- PRINT DATE — 44 ▶ LOWER LEFT
- PRINT COMMENTARY STRING — 45 ▶ LOWER RIGHT

52 — ☐ PRINT TIME

53 — OOOOOOOO@co.jp

FORMAT SETTING
- FONT: 54 ▶ MS P GOTHIC    SIZE: 55 ▶ 10 Pts
- STYLE: 56 ▶ NORMAL    COLOR: 57 ▶ BLACK

OK — 58    CANCEL

FIG. 17

HEADER/FOOTER PRINTING — 40b

PRIORITY ORDER

| | | |
|---|---|---|
| PRINT USER NAME | [3 ▶] 310 | [NO ▶] 41 |
| PRINT COMPUTER NAME | [5 ▶] 311 | [UPPER LEFT ▶] 42 |
| PRINT PAGE NUMBER | [1 ▶] 312 | [NO ▶] 43 |
| PRINT DATE | [2 ▶] 313 | [LOWER LEFT ▶] 44 |
| PRINT COMMENTARY STRING | [4 ▶] 314 | [LOWER RIGHT ▶] 45 |

□ PRINT TIME — 52

[OOOOOOOO@co.jp] — 53

FORMAT SETTING

FONT: [MS P GOTHIC ▶] 54    SIZE: [10 ▶] 55 Pts

STYLE: [NORMAL ▶] 56    COLOR: [BLACK ▶] 57

( OK ) 58    ( CANCEL )

PRINTING PROGRAM THAT ADJUSTS ANNOTATION LOCATION AND SIZE

BACKGROUND OF THE INVENTION

1. Field of the Invention

The present invention relates to a printing program having a function of attaching commentary string data relating to a commentary such as a header note or a footer note to print data.

2. Description of the Related Art

Heretofore, there has been known a printer driver with a function of attaching commentary string data relating to a commentary such as a header note or a footer note to print data, in response to accepting print designation by a user on an application software such as a wordprocessor software.

In printing data by utilizing the above function, text information or commentary string information may be lost, if, for instance, as shown in FIG. 7B, a text including an image or the like, and a commentary string overlap each other (see the portion indicated by the reference numeral 42a), or commentary strings overlap each other (see the portions indicated by the reference numerals 44a and 45a).

In the case where print magnification information to be inputted from an input section of a computer indicates enlarging a targeted rendering area, if printing is performed by using the above function, the commentary string may also be enlarged along with the text. As a result, the commentary string information may be lost. For instance, as shown in FIG. 8A, the entirety of the commentary string (see the portions indicated by the reference numerals 44a and 45a), or a part of the commentary string (see the portion indicated by the reference numeral 42a) may be deviated from an effective printing area.

The effective printing area is an area 62 enclosed by the dotted-line frame in FIG. 6, and corresponds to an area on a recording sheet where data is printable by a printer.

In view of the above, there is known a printer driver operable to reduce a rendering area of print data corresponding to a text in such a manner that the rendering area of the print data may not be overlapped with the rendering area of commentary string data, before the commentary string data is attached to the print data. Hereinafter, the rendering area of print data is called as a "primary rendering area", and the rendering area of commentary string data is called as a "sub rendering area".

In the approach of reducing the rendering area of print data, the primary rendering area is reduced in such a manner that the primary rendering area is not overlapped with the sub rendering area. As a result of the approach, the print size of the text may be unduly reduced to an unwanted size. Further, the above approach is not effective in suppressing loss of commentary string information because the entirety or a part of the commentary string may be deviated from the effective printing area.

SUMMARY OF THE INVENTION

In view of the above problems, it is an object of the invention to provide a printing program that enables to suppress loss of text information and commentary string information without reducing the print size of the text.

A computer-readable recording medium recorded with a printing program according to an aspect of the invention is a computer-readable recording medium recorded with a printing program which causes a processor of a computer to execute an operation of attaching commentary string data representing a commentary string to print data. The printing program causes the processor to execute: a first step of calculating a rendering area of the print data stored in a storing section of the computer as a primary rendering area based on the print data, and calculating a rendering area of the commentary string data to be attached to the print data as a sub rendering area based on the commentary string data; a second step of judging whether the primary rendering area and the sub rendering area overlap each other, and judging whether at least a part of the sub rendering area is deviated from an effective printing area; a third step of changing the commentary string data to edit the commentary string in such a manner that the primary rendering area and the sub rendering area do not overlap each other, and that the entirety of the sub rendering area is located within the effective printing area, if at least one of the judgment results in the second step is affirmative; and a fourth step of attaching the changed commentary string data to the print data.

In the above arrangement, the printing program is operative to change the commentary string data to edit the commentary string in such a manner that the rendering area of the print data i.e. the primary rendering area, and the rendering area of the commentary string data i.e. the sub rendering area do not overlap each other, and that the entirety of the sub rendering area is located within the effective printing area of a recording sheet. This is advantageous in suppressing loss of text information and commentary string information without reducing the print size of the text.

A computer-readable recording medium recorded with a printing program according to another aspect of the invention is a computer-readable recording medium recorded with a printing program to be installed in a storing section of a computer provided with a processor, an input section, a display section, the storing section, and a temporary storage for storing print data, commentary string data representing a commentary string, and position information on the commentary string. The printing program causes the processor to execute, before the processor accepts a print start designation accepted by the input section: a displaying step of displaying, on the display section, a screen for selecting a commentary string; an accepting step of accepting, on the screen, the selection by the input section; and a determining step of determining the accepted commentary string as a part of the commentary string data. The printing program further causes the processor to execute, after the processor accepts the print start designation: a shifting step of changing the position information of the commentary string data to shift the commentary strings in such a manner that a rendering area of the print data and a rendering area of the commentary string data do not overlap each other, and that the rendering areas of the commentary strings represented by the commentary string data do not overlap each other; and an attaching step of attaching the changed commentary string data to the print data.

In the above arrangement, the commentary string selected by the input section is shifted in such a manner that the rendering area of the print data and the rendering area of the commentary string data do not overlap each other, and that the rendering areas of the commentary strings represented by the commentary string data do not overlap each other. This is advantageous in suppressing loss of a commentary string which is selected and deemed to be important to the user by overlapping with the print data or the other commentary string without reducing the print size of the text.

A computer-readable recording medium recorded with a printing program according to yet another aspect of the invention is a computer-readable recording medium recorded with a printing program to be installed in a storing section of a computer provided with a processor, an input section, a display section, the storing section, and a temporary storage for storing print data and commentary string data representing a commentary string. The printing program causes the processor to execute: a shifting step of changing the commentary string data to shift the commentary string in such a manner that a rendering area of the print data and a rendering area of the commentary string data do not overlap each other; a displaying step of displaying, on the display section, a print preview screen showing an image that the changed commentary string data is attached to the print data, after the shifting step is executed and before the print data is transmitted to an image forming apparatus; a transmission checking step of checking, on the print preview screen, whether transmission of the print data attached with the changed commentary string data is accepted by the input section; and a suspending step of suspending the transmission if the transmission is not accepted in the transmission checking step.

In the above arrangement, before the print data is transmitted to the image forming apparatus, the display section displays the print preview screen after the shifting step is executed in such a manner that the rendering area of the print data and the rendering area of the commentary string data do not overlap each other. Then, it is checked, on the print preview screen, whether the input section has accepted the transmission of the print data attached with the changed commentary string data. If it is checked that the input section has not accepted the transmission, the transmission is suspended. This is advantageous in suppressing loss of text information and commentary string information, and suppressing generation of an unwanted print result.

These and other objects, features and advantages of the present invention will become more apparent upon reading the following detailed description along with the accompanying drawings.

BRIEF DESCRIPTION OF THE DRAWINGS

FIG. 13A is a diagram showing a print result to be obtained in the case where the first embodiment is applied.

FIG. 13B is a diagram showing a rendering area to be obtained in printing all the pages shown in FIG. 13A one over the other.

FIG. 14 is a diagram showing a print result to be obtained in the case where the third embodiment is applied.

FIG. 15 is a diagram showing a header/footer print dialog box to be displayed in the third embodiment.

FIG. 17 is a diagram showing a header/footer print dialog box to be displayed in a sixth embodiment of the invention.

DETAILED DESCRIPTION OF THE PREFERRED EMBODIMENTS

First Embodiment

Figure 9:
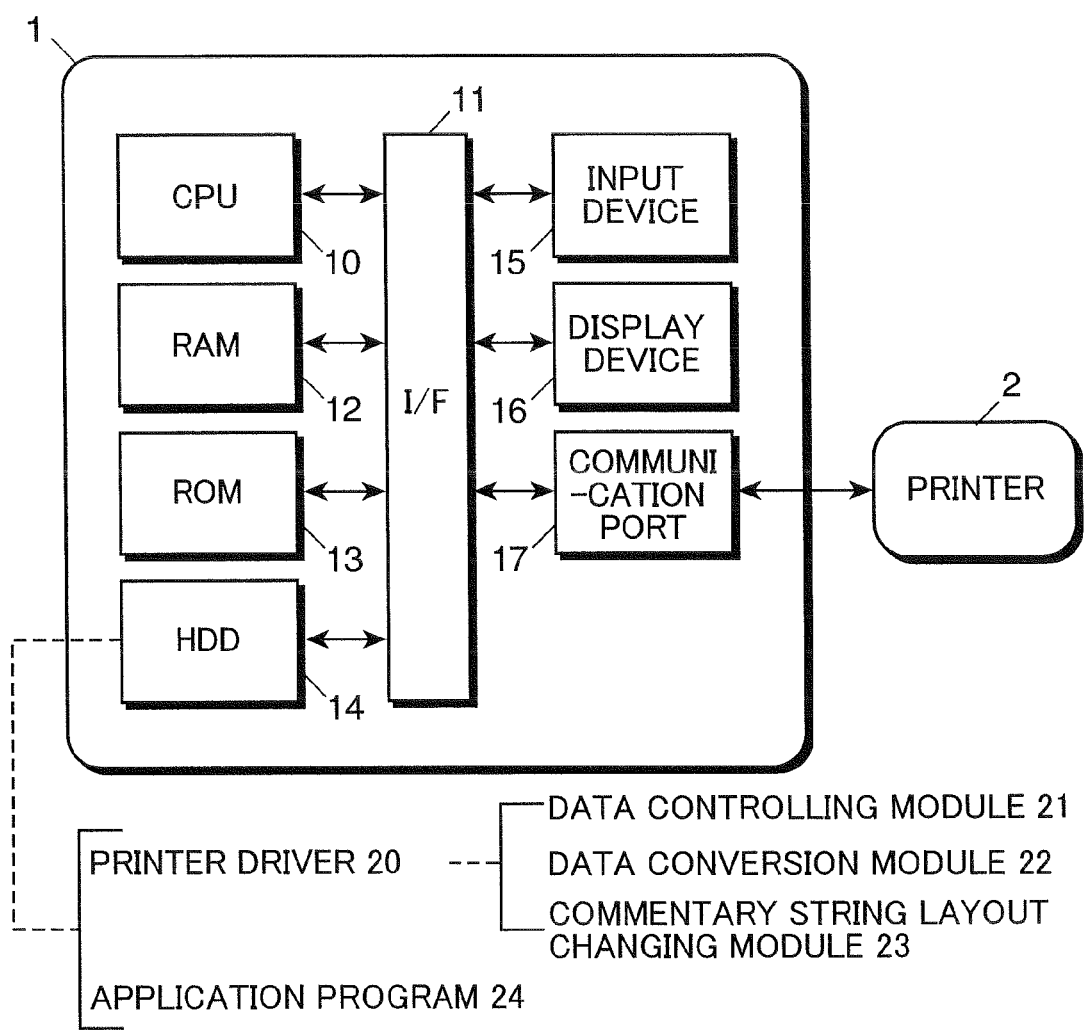
FIG. 9 is a block diagram schematically showing a hardware configuration of an image forming system as the first embodiment of the invention.

FIG. 9 is a block diagram schematically showing a hardware configuration of an image forming system in accordance with the first embodiment of the invention.

The image forming system includes a computer 1 such as a personal computer, and a printer 2. The printer 2 is a PDL (page description language) compatible printer. The printer 2 adopts a method of developing print data i.e. PDL data converted by a printer driver 20 into bitmap data by the printer 2 for printing.

The computer 1 has a CPU (central processing unit) 10 as a processor. An RAM (random access memory) 12 as a storing section or a temporary storage, an ROM 13 as a storing section, an HDD 14 as a storing section, an interactive input device 15 as an input section such as a keyboard or a pointing device, a display device 16, and a communication port 17 such as a USB port or a parallel port are communicatively connected to the CPU 10 via an interface (I/F) section 11. In FIG. 9, plural interfaces are indicated by one block of the I/F section 11 to simplify the description. The communication port 17 is connected to the printer 2 via a cable or a wireless communication medium.

The RAM 12 serves as a main memory. The ROM 13 stores therein a bootstrap program and BIOS. The HDD 14 stores therein an operating system (OS), application programs, driver setting data including commentary string data 18, and various device drivers including a printer driver 20, which is a primary element of the embodiment of the invention.

The CPU 10 executes various programs such as the operating system (OS), the application programs, and the device drivers including the printer driver 20. Operations of the programs such as application programs, modules, and drivers are realized when the respective programs are executed by the CPU 10.

The printer driver 20 includes a data controlling module 21 having a function of controlling print data, a data conversion module 22 having a function of converting a description language of print data into a language interpretable by the printer 2, and a commentary string layout changing module 23 having a function of changing the layout of the commentary string data 18 such as a header note or a footer note, which is also a primary element of the embodiment.

The commentary string data 18 includes data indicating a character string, position information for use in printing the commentary string, and information indicating the font size of the characters. The commentary string layout changing module 23 performs an editing operation of shifting the print position of the commentary string, or changing the layout of the commentary string by changing the position information included in the commentary string data 18. The commentary string layout changing module 23 performs an editing operation of reducing or increasing the size of the commentary string by changing the font size information included in the commentary string data 18.

The application programs include an application program 24 having a function of printing a document, an image, or the like. Examples of the application program 24 are a document creating software, a spreadsheet software, an imaging software, and a Web browser.

The printer driver 20 or the commentary string layout changing module 23 is generally recorded, as an individual program, in a program recording medium readable by the computer 1 e.g. a Floppy Disk® or a CD-ROM. The printer driver 20 or the commentary string layout changing module 23 is read out from the recording medium, and installed in the HDD 14. Alternatively, the printer driver 20 or the commentary string layout changing module 23 may be recorded in a recording medium of the other computer e.g. a server computer, and may be installed via a communications line such as LAN or the Internet.

The following is a description on a control flow to be executed when the application program 24 runs. By executing the control flow, a commentary string such as a header note or a footer note is set, the layout of the commentary string data 18 is changed by utilizing the commentary string layout changing module 23, and the contents displayed on a screen of the display device 16 is printed on a recording sheet by the application program 24.

Figure 2:
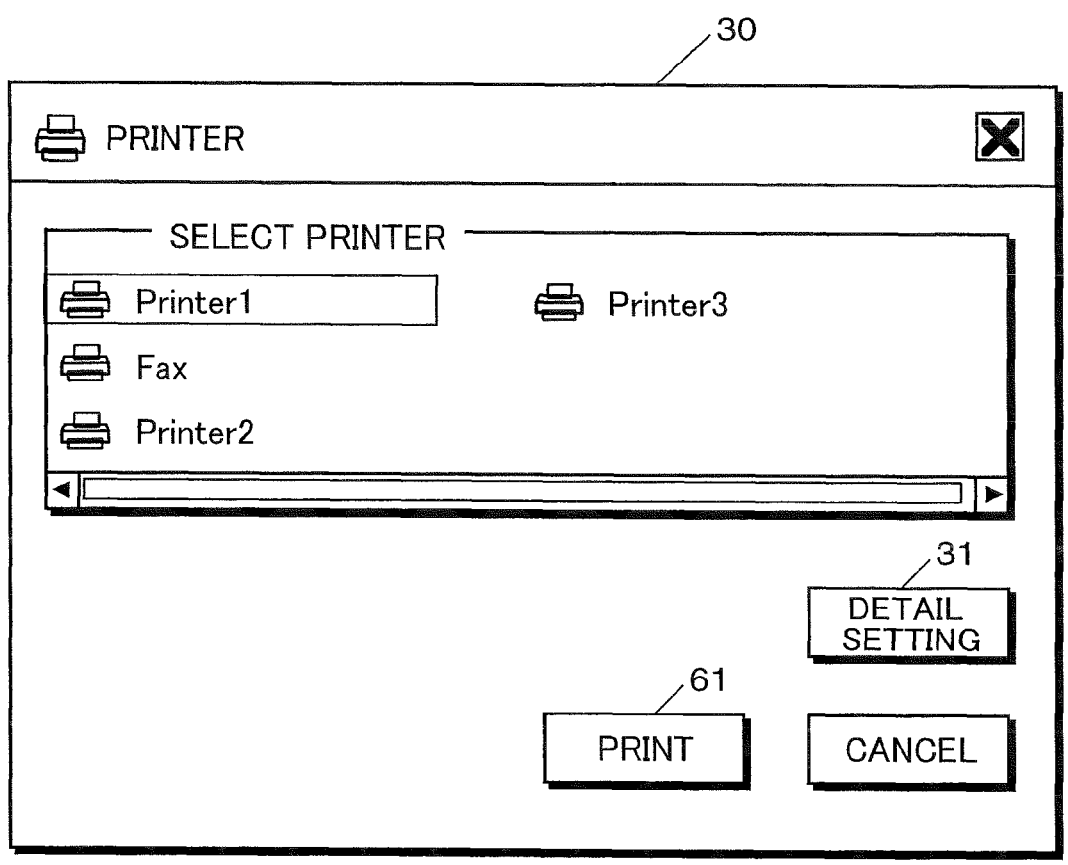
FIG. 2 is a diagram showing a print dialog box to be displayed on a screen of a display device of the image forming system.
Figure 3:
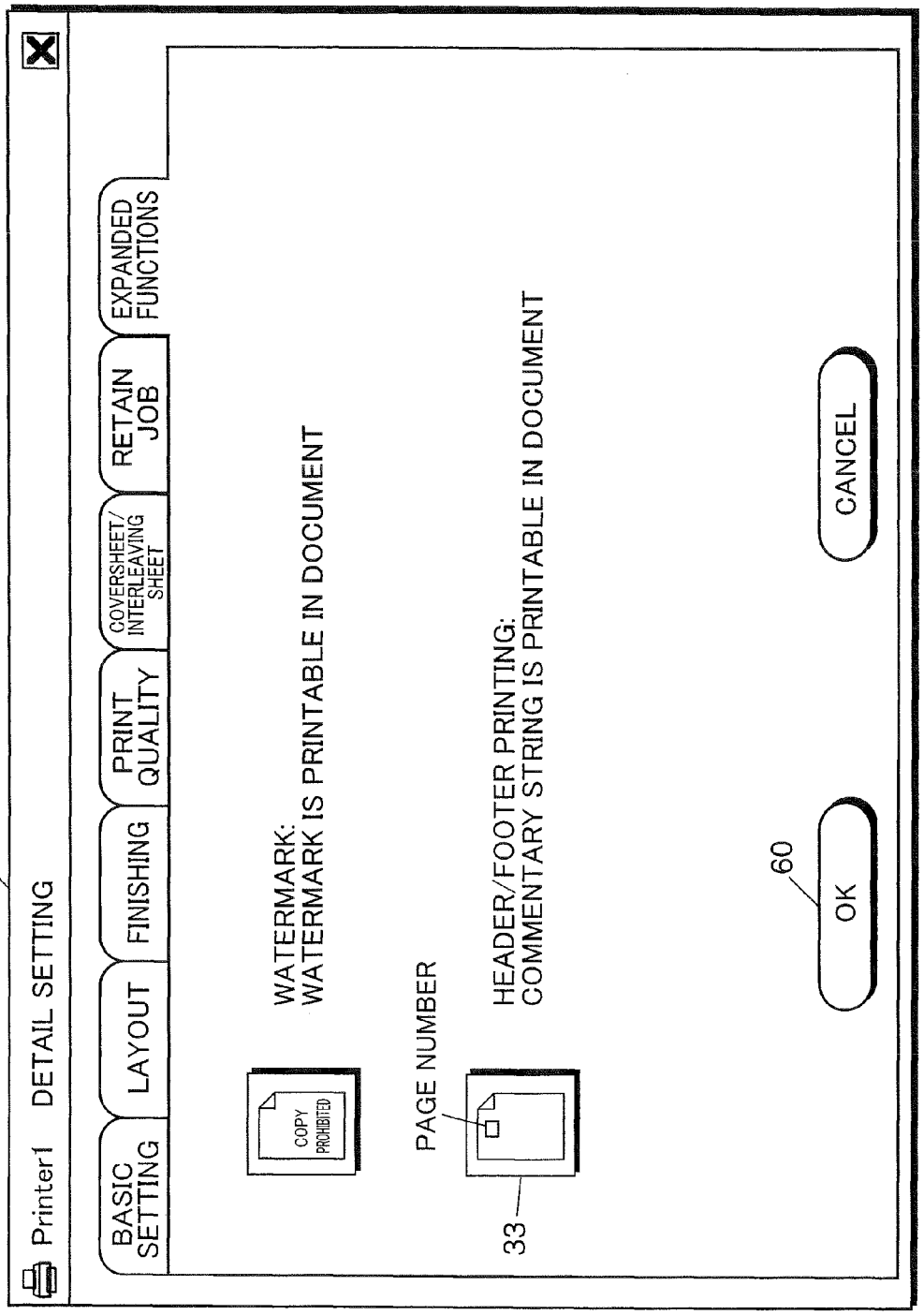
FIG. 3 is a diagram showing a print setting dialog box to be displayed on the screen of the display device.

In response to user's selecting a print menu displayed on the screen of the display device 16 by the application program 24 by way of the input device 15, a print dialog box 30 as shown in FIG. 2 is displayed. While the print dialog box 30 is opened, in response to user's selecting the name of the printer to be used by way of the input device 15, and user's depressing a detail setting button 31, a setting routine of the printer driver 20 is called. Then, the CPU 10 is operative to display, on the screen of the display device 16, a print setting dialog box 32 corresponding to the selected printer name as shown in FIG. 3.

The print setting dialog box 32 is displayed by the printer driver 20. Operations concerning the print setting dialog box 32 are operable when the CPU 10 executes the printer driver 20.

Figure 4:
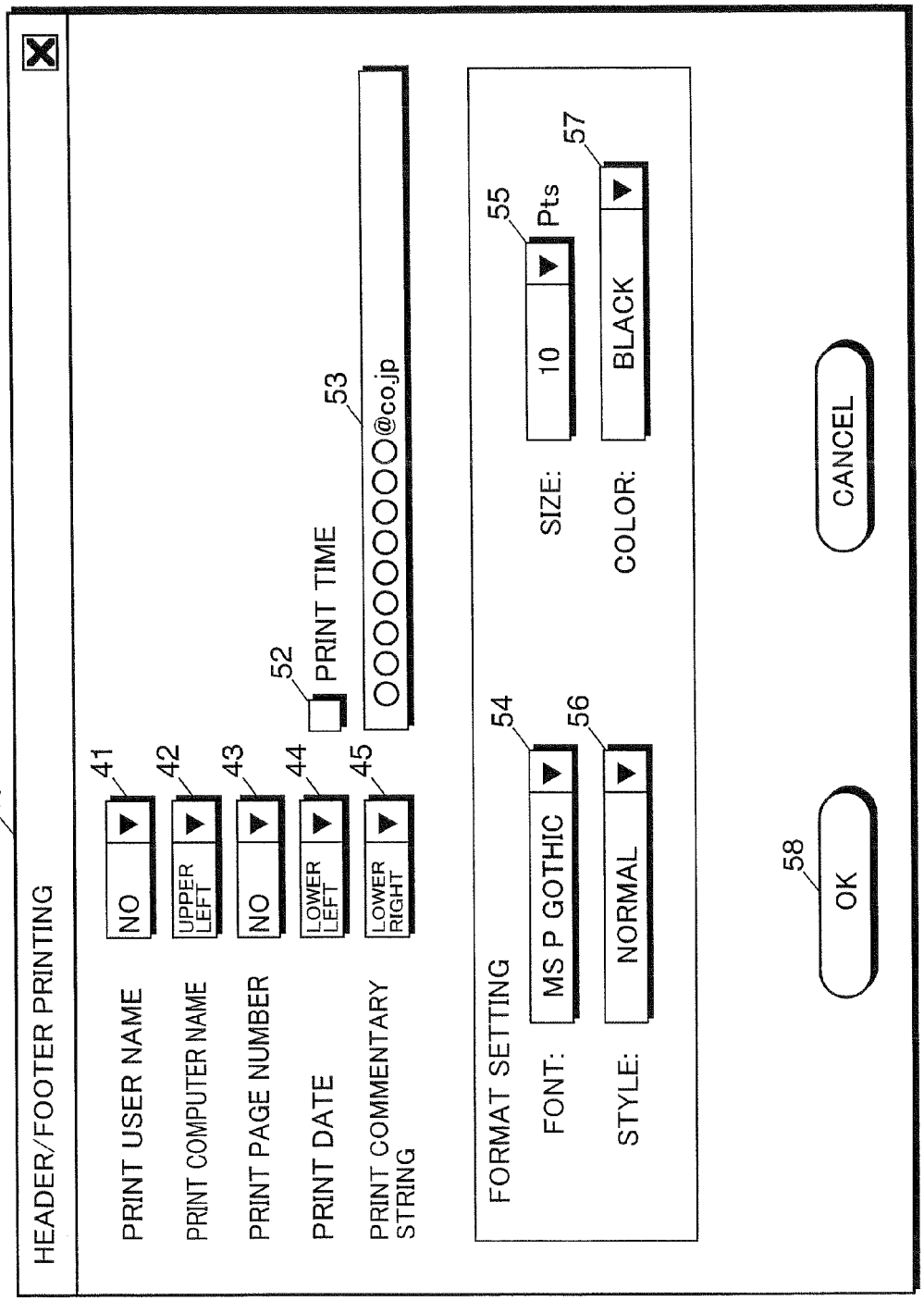
FIG. 4 is a diagram showing a header/footer print dialog box to be displayed on the screen of the display device.

Then, in response to user's depressing a header/footer print button 33 in the print setting dialog box 32 by way of the input device 15, a header/footer print dialog box 40 as shown in FIG. 4 is displayed.

Figure 6:
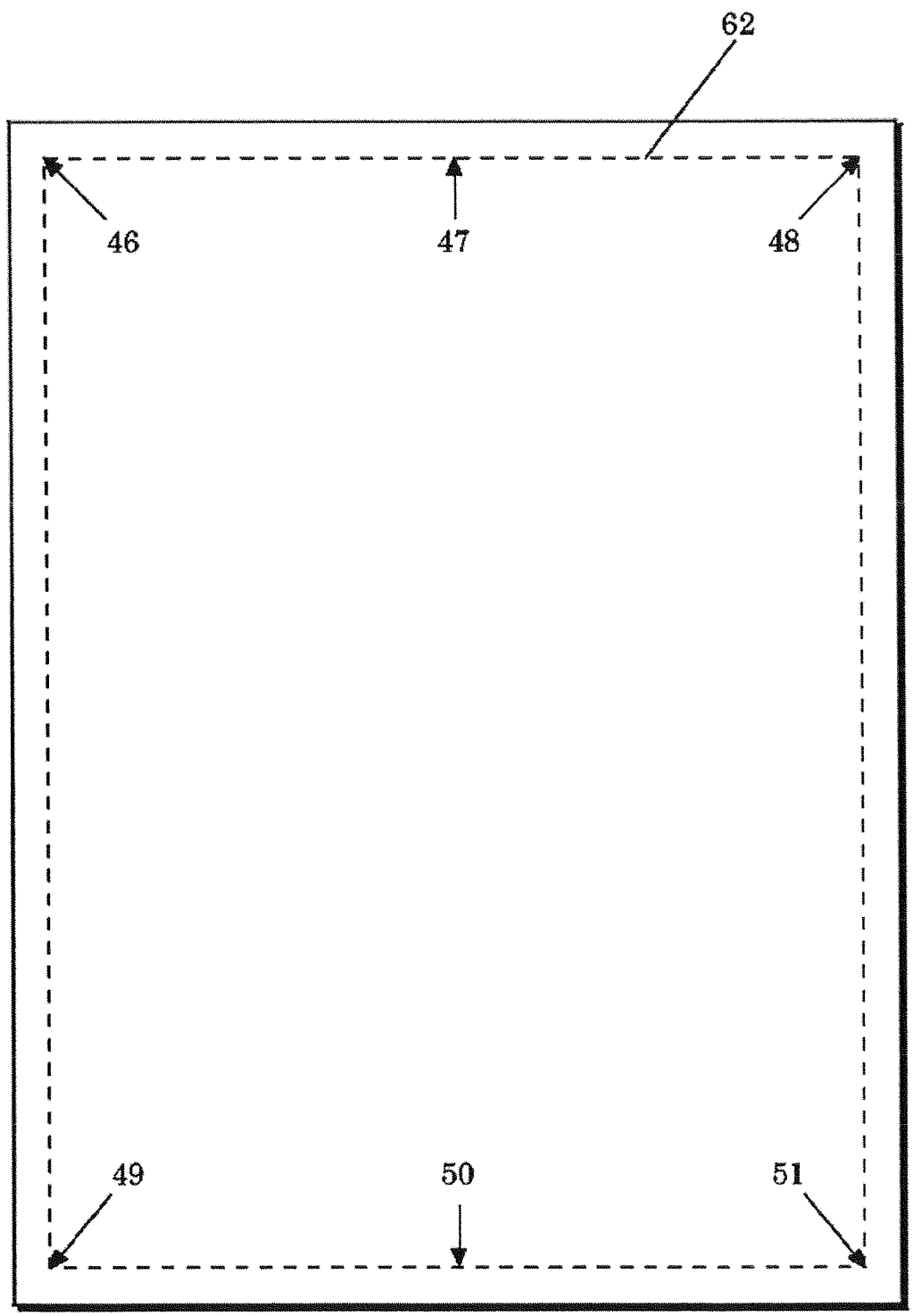
FIG. 6 is a diagram for describing an effective printing area, and start points of a header and a footer.

While the header/footer print dialog box 40 is opened, the user is allowed to select whether the user name, the computer name, the page number, the date, or a user-optional commentary string is to be attached to print data, as a header note or a footer note, as well as the positions thereof, by selection boxes 41, 42, 43, 44, and 45 corresponding to these print items, respectively. Specifically, as shown in FIG. 4, the user is allowed to select a setting "NO" indicating that the print item in the corresponding selection box is not to be printed, and one of the print positions of the print item in the corresponding selection box e.g. an upper left position 46, an upper middle position 47, an upper right position 48, a lower left position 49, a lower middle position 50, and a lower right position 51 on a recording sheet as shown in FIG. 6 with respect to the selection boxes 41 through 45.

In the case where the commentary string data 18 relating to the date is attached to print data, the user is allowed to select whether a character string indicating the time is to be additionally attached following the commentary string by using a checkbox 52 in the header/footer print dialog box 40. The user is also allowed to attach a user-optional commentary string to print data by inputting the user-optional commentary string in an input box 53. Further, the user is allowed to select a font, a font size, a writing style, and a color relating to format setting of commentary string by way of selection boxes 54, 55, 56, and 57, respectively.

In the following, description is made on a case that the upper left position 46 is selected from the list of the selection box 42 corresponding to an indication "PRINT COMPUTER NAME" displayed in the header/footer print dialog box 40; the lower left position 49 is selected from the list of the selection box 44 corresponding to an indication "PRINT DATE"; the lower right position 51 is selected from the list of the selection box 45 corresponding to an indication "PRINT CHARACTER STRING"; and an email address is inputted in the input box 53 corresponding to the indication "PRINT CHARACTER STRING". All the other settings shown in FIG. 4 are defaulted.

As described above, after the header/footer is set, in response to user's depressing an OK button 58 shown in FIG. 4 by way of the input device 15, the printer driver 20 is operative to determine the aforementioned setting contents as the driver setting data which is stored in the HDD 14 as the commentary string data 18. Then, the printer driver 20 is operative to close the header/footer print dialog box 40, and simultaneously activate the print setting dialog box 32 shown in FIG. 3.

Then, in response to user's depressing an OK button 60 in the print setting dialog box 32 by way of the input device 15, the printer driver 20 is operative to determine the other print setting information in the driver setting data e.g. recording sheet information and layout information, close the print setting dialog box 32, and simultaneously activate the print dialog box 30 shown in FIG. 2.

Then, in response to user's depressing a print button 61 in the print dialog box 30 by way of the input device 15, the printer driver 20 is operative to attach the commentary string data 18 stored in the RAM 12 to print data, whereby the print contents after the commentary string data 18 is attached to the print data is printed on a recording sheet.

In the specification, the data to be attached to print data is not referred to as header data or footer data, but is referred to as the commentary string data 18 for the following reason. As will be described later, since the commentary string layout changing module 23 is operative to shift the commentary string as a header note or a footer note, the commentary string may be attached to a position other than the area corresponding to a header or a footer.

In the following, a control flow of printing the contents of print data on a recording sheet in response to user's depressing the print button 61 is described referring to a functional block diagram shown in FIG. 1. The functional block diagram merely shows functional parts relating to a printing program to be used in the image forming system of the embodiment.

In response to user's depressing the print button 61, the application program 24 calls a function of a GDI (graphics device interface) 100 in correspondence to document data created by the application program 24, and hands the document data to the function i.e. converts the document data into a GDI rendering command.

The function of the GDI 100 is operative to convert the GDI rendering command to a rendering command i.e. a DDI command interpretable by the printer driver 20, and store the DDI command in the RAM 12 or a spool area on the HDD 14, as an EMF (enhanced metafile) file 101.

A print spooler 102 is operative to check whether the printer 2 is in a printable condition by performing a background operation, and sequentially hand the contents of the EMF file 101 stored in the spool area to the printer driver 20 upon confirming that the printer 2 is in a printable condition.

In response to the above operation, the printer driver 20 calls the data controlling module 21 in the printer driver 20.

In response to the calling, the data controlling module 21 hands the print data which has been sequentially outputted from the print spooler 102 to the data conversion module 22, and judges whether a statement of the data indicates pagination. If the judgment result is affirmative, the data controlling module 21 reads out the driver setting data, and judges whether the readout driver setting data includes the commentary string data 18. Then, if it is judged that the readout driver setting data includes the commentary string data 18, the data controlling module 21 calls the commentary string layout changing module 23 before handing the pagination statement to the data conversion module 22.

In response to the calling, the commentary string layout changing module 23 interprets the EMF file 101, changes the layout of the commentary string data 18 if the following predetermined condition is satisfied, and hands the layout-changed commentary string data 18 to the data controlling module 21.

In response to the handing operation, similarly to the case that the data controlling module 21 has received the print data, the data controlling module 21 hands the commentary string data 18 to the data conversion module 22, and then hands the pagination statement to the data conversion module 22. By this control, the commentary string data 18 is attached to the print data before the pagination. Thereafter, the aforementioned operation is repeated with respect to print data corresponding to the remaining pages which are sequentially outputted from the print spooler 102.

Figure 7A:
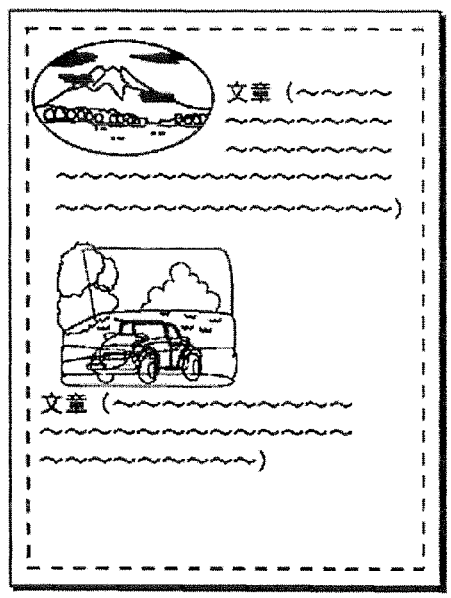
FIG. 7A is a diagram showing a print result of print data corresponding to a text.
Figure 7B:
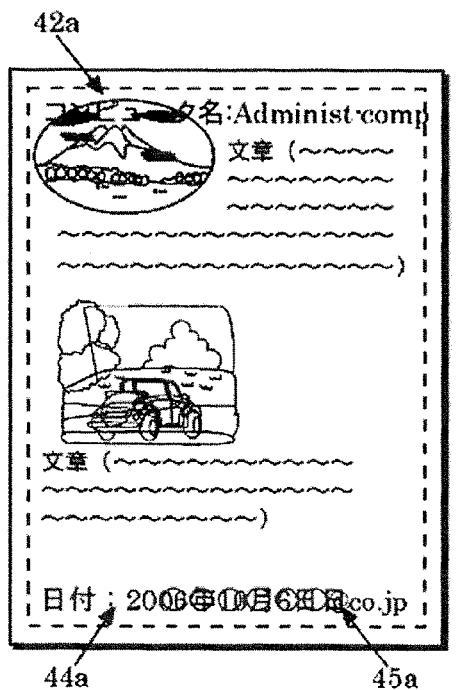
FIG. 7B is a diagram showing a print result, wherein commentary string data is attached to print data corresponding to a text, based on the commentary string data without processing.
Figure 7C:
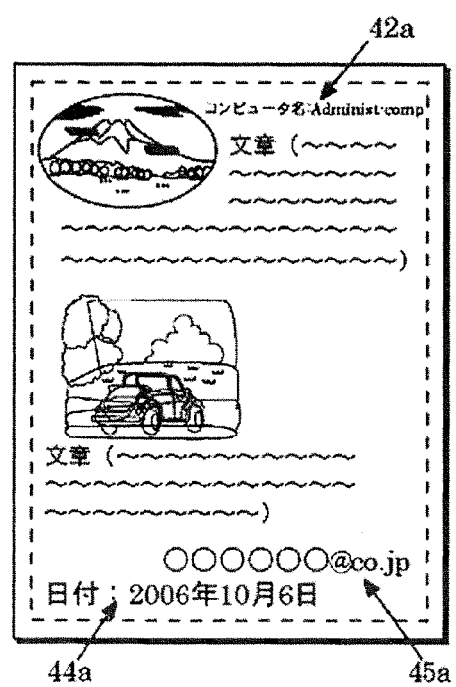
FIG. 7C is a diagram showing a print result, wherein commentary string data is attached to print data corresponding to a text, after a commentary string is shifted or the size thereof is reduced based on the print data corresponding to a text and the commentary string data.

In the case where a print result, as shown in FIG. 7A, which is obtained merely based on print data corresponding to a text, is printed without changing the commentary string data 18, a print result as shown in FIG. 7B is obtained. Specifically, in FIG. 7B, the rendering area of print data as a primary rendering area, and the rendering area of the commentary string data 18 as a sub rendering area overlap each other, and multiple sub rendering areas overlap each other. The reference numerals 42a, 44a, and 45a shown in FIGS. 7B and 7C respectively indicate commentary strings of the computer name, the date, and the email address.

Figure 8B:
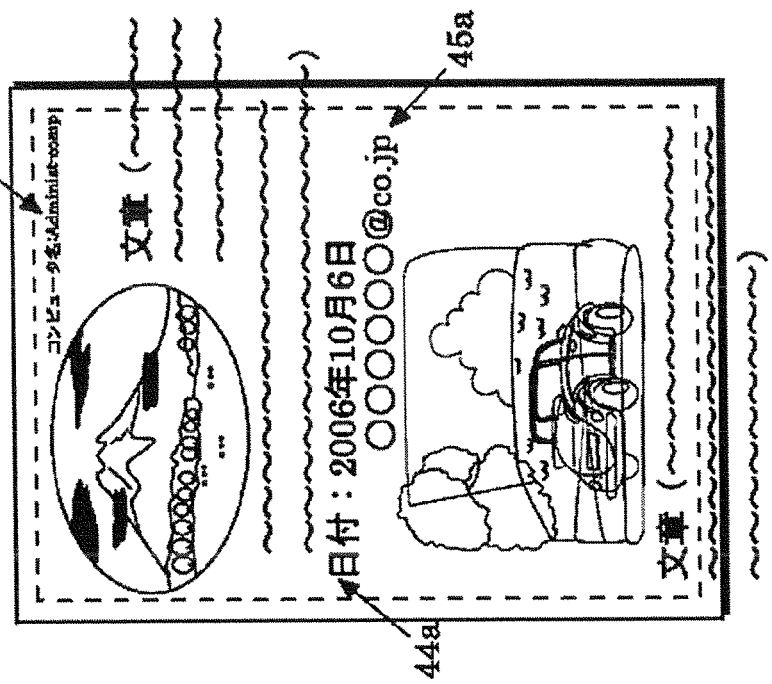
FIG. 8B is a diagram showing a print result, wherein commentary string data is attached to print data corresponding to a text, after a commentary string is shifted or the size thereof is reduced based on the print data corresponding to a text and the commentary string data, in the case where print magnification information indicates enlarging.
Figure 8A:
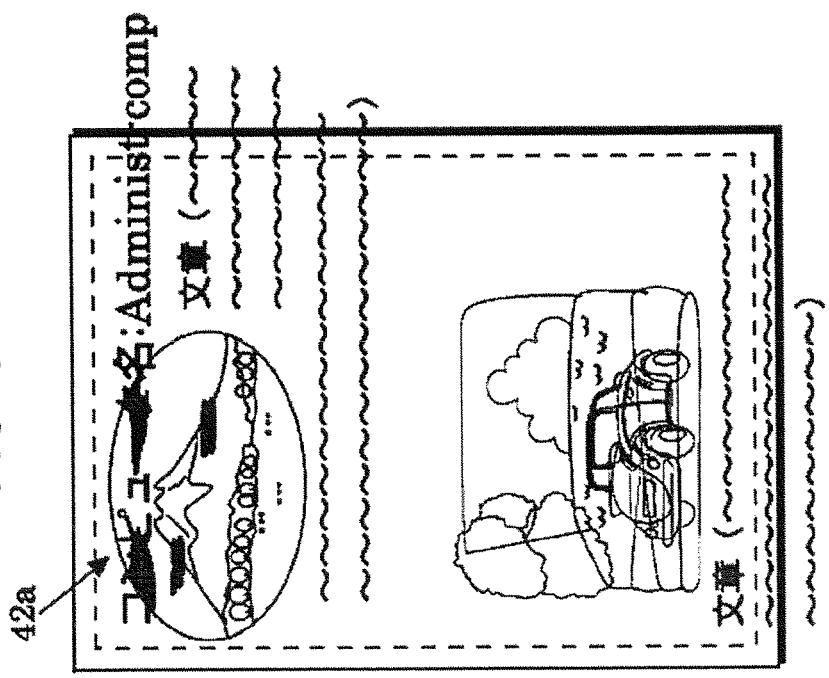
FIG. 8A is a diagram showing a print result, wherein commentary string data is attached to print data corresponding to a text without changing the commentary string data, in the case where print magnification information indicates enlarging.

In the case where print magnification information indicating a print magnification is accepted by the input device 15 in response to user's entering the print magnification information by way of the input device 15, and the print magnification information indicates enlarging a targeted rendering area, if printing is performed without changing the commentary string data 18, a print result as shown in FIG. 8A may be obtained. Specifically, at least a part of the sub rendering area i.e. the entirety or a part of the sub rendering area may be deviated from the effective printing area 62. Referring to FIG. 8A, a part "st-comp" of the computer name 42a "Administ-comp", the entirety of the date 44a "Oct. 6, 2006", and the entirety of the email address 45a "oooooo@co.jp" are not actually printed. However, for sake of explanation, the unprinted portions are shown in FIG. 8A.

In order to eliminate the aforementioned drawback, the commentary string layout changing module 23 as a primary element of the printing program in the embodiment is operative to change the position coordinate or the font size of the commentary string represented by the commentary string data 18 so as to shift the commentary string or reduce the size of the commentary string in such a manner that: a primary rendering area and a sub rendering area in one-page print data included in the EMF file 101 do not overlap each other; rendering areas of multiple commentary string data 18 do not overlap each other; and the entirety of a rendering area of the commentary string data 18 is located within the effective printing area 62 of a recording sheet.

The data conversion module 22 is operative to convert the data outputted from the data controlling module 21 into a PDL language interpretable by the printer 2, and hand the PDL data as RAW data to the print spooler 102.

Upon receiving the RAW data, the print spooler 102 transmits the RAW data to the printer 2 via the interface section 11 and the communication port 17.

The printer 2 is operative to interpret the RAW data sequentially transmitted from the print spooler 102, and develop one-page print data including a commentary string layer, layer by layer, into bitmap data for synthesis. Thereafter, the printer 2 is operative to form an electrostatic latent image on a photosensitive drum of a printer engine based on the synthesized data, develop the latent image into a toner image, and transfer the toner image onto a recording sheet, followed by image fixation and sheet discharge.

Figure 5:
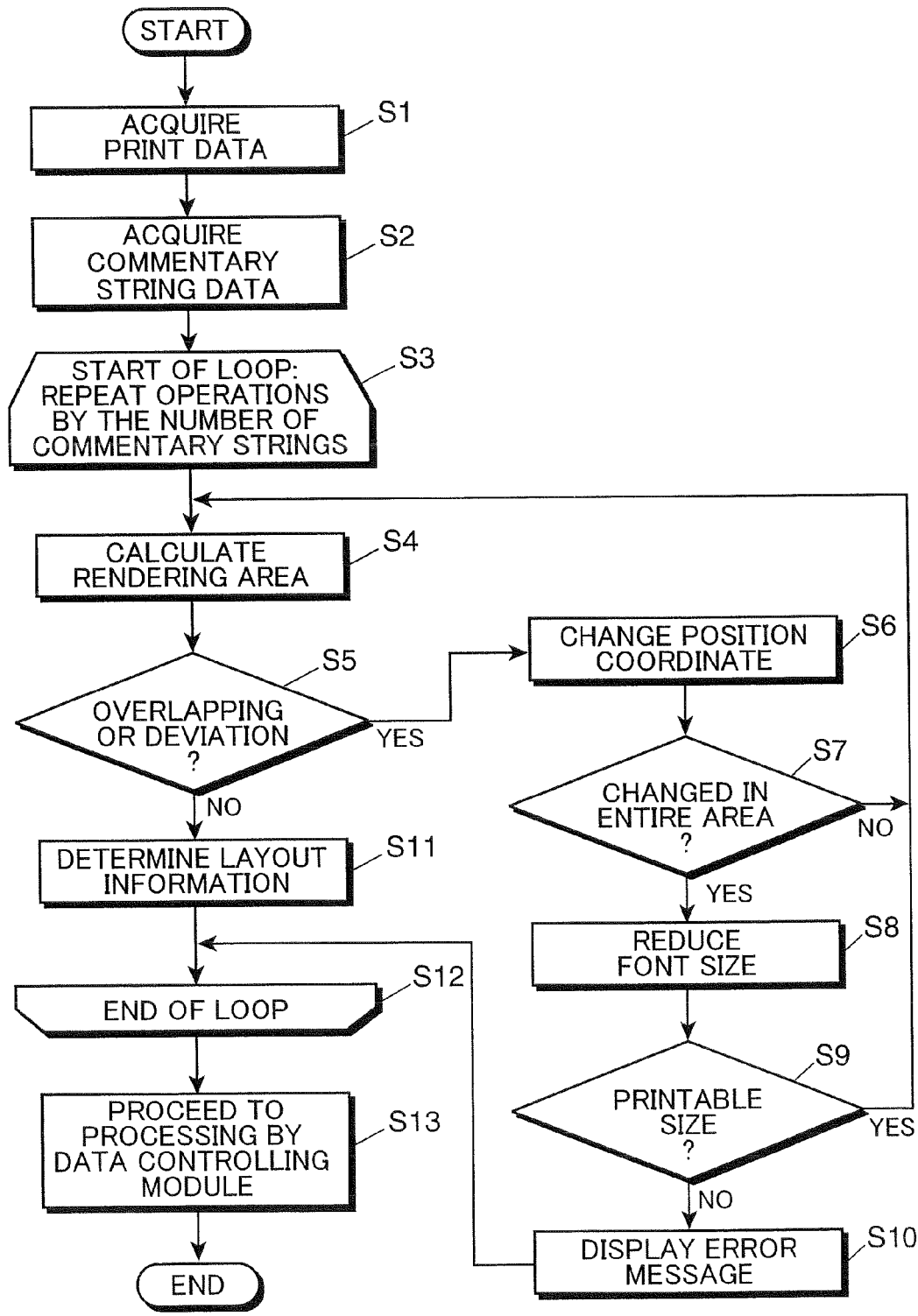
FIG. 5 is a flowchart showing an operation to be executed by a CPU in accordance with a commentary string layout changing module in a first embodiment or a third embodiment of the invention.

FIG. 5 is a flowchart showing an operation to be executed by the CPU 10 in accordance with the commentary string layout changing module 23. The flowchart of FIG. 5 is described in the order of Steps S1 through S13.

In Step S1, the CPU 10 acquires rendering information such as position information relating to characters and images, and formatting information, as well as one-page print data before pagination, including print setting information such as sheet size information, print magnification information, and layout information.

In Step S2, the CPU 10 acquires the commentary string data 18 including character information; and rendering information such as position information and formatting information relating to the character information e.g. font or font size.

In Step S3, the CPU 10 repeats the operations from Step S4 to Step S12 by the number of commentary strings to be attached.

In Step S4, the CPU 10 calculates a rendering area of the one-page print data based on the one-page print data acquired from the EMF file 101, and stores the calculated rendering area into the RAM 12 as a primary rendering area. The CPU 10 also calculates a rendering area of the commentary string data 18 based on the commentary string data 18, and stores the calculated rendering area into the RAM 12 as a sub rendering area. The rendering area to be calculated is e.g. an area obtained by approximating each of rendering objects such as character strings, vector graphics objects, and images to a rectangular area. In the case where print magnification information is inputted by way of the input device 15, the CPU 10 calculates the rectangular areas of the primary rendering area and the sub rendering area, considering the magnification.

In Step S5, the CPU 10 judges whether the primary rendering area and the sub rendering area overlap each other, judges whether multiple sub rendering areas overlap each other, and judges whether at least a part of the sub rendering area i.e. the entirety or a part of the sub rendering area is deviated from the effective printing area 62 by performing a graphic logical AND operation. If the judgment result is affirmative, in other words, if it is judged that overlapping or deviation has occurred, the routine proceeds to Step S6. If, on the other hand, the judgment result is negative, the routine proceeds to Step S11.

In Step S6, the CPU 10 changes the position coordinate of a commentary string represented by the commentary string data 18 e.g. the upper left apex coordinate of a rectangular frame of the targeted commentary string within the effective printing area 62 to shift the targeted commentary string. In this operation, any shifting approach may be used. In the first embodiment, the commentary string is sequentially shifted in a predetermined order of upper, lower, left, and right positions depending on the initial position coordinate (see FIG. 6) of the commentary string by the pitch of e.g. 1 mm.

In Step S7, the CPU 10 judges whether the position coordinate of the commentary string is shifted within the entirety of the effective printing area 62. If the judgment result is affirmative, the routine proceeds to Step S8. If, on the other hand, the judgment result is negative, the routine returns to Step S4. In this way, by repeating the operations from Step S4 to Step S7, in Step S5, the position of the commentary string free of overlapping or deviation is sought within the entirety of the effective printing area 62.

In Step S8, the CPU 10 reduces the size of the commentary string by changing the font size of the commentary string data 18 by one point, for instance.

In Step S9, the CPU 10 judges whether the changed font size is a printable size. If it is judged that the changed font size is a printable size, in other words, the font size is larger than the lower size limit, the routine returns to Step S4. If, on the other hand, the changed font size is smaller than the lower size limit, the routine proceeds to Step S10.

In Step S10, the CPU 10 displays an error message showing, on the screen of the display device 16, that the commentary string data 18 is not allowed to be attached to the targeted one-page print data. Thereafter, the routine proceeds to Step S12.

In Step S11, the CPU 10 determines the layout information in the commentary string data 18 relating to one commentary string.

In Step S13, the CPU 10 outputs the commentary string data 18 from the data conversion module 22 to the data controlling module 21. Similarly to the operation to be executed by the data controlling module 21 in response to receiving print data, the data controlling module 21 outputs the commentary string data 18 to the data conversion module 22. Thereafter, the pagination statement is outputted to the data conversion module 22. In response to output of the pagination statement, the commentary string data 18 is attached to the print data before pagination.

In the first embodiment, the commentary string layout changing module 23 is operative to change the position coordinate or the font size of the commentary string represented by the commentary string data 18 to shift the commentary string to be printed by the printer 2 or reduce the size of the commentary string in such a manner that the primary rendering area and the sub rendering area do not overlap each other, and that the entirety of the sub rendering area is located within the effective printing area 62 of a recording sheet. This is advantageous in preventing loss of text information and commentary string information without reducing the print size of the text.

There is known a format overlay controlling method of shifting a commentary string or reducing the size of the commentary string in such a manner that a primary rendering area and a sub rendering do not overlap each other. The format overlay controlling method is not effective in preventing overlapping of commentary strings, if the multiple commentary strings are to be attached. The commentary string information may be lost by overlapping of commentary strings, or deviation of the entirety or a part of a commentary string from the effective printing area. The format overlay controlling method may also have a drawback that the commentary string information may be lost by overlapping of commentary strings, or deviation of the entirety or a part of a commentary string from the effective printing area, as a result of shifting of the commentary string.

On the other hand, in the first embodiment, in attaching multiple commentary strings, the position coordinate or the font size of the commentary string represented by the commentary string data 18 is changed to shift the commentary string or reduce the size of the commentary string in such a manner that multiple sub rendering areas do not overlap each other. This is advantageous in preventing loss of commentary string information.

Second Embodiment

In this section, a functional arrangement of an image forming system in accordance with the second embodiment is described. The image forming system is configured in such a manner that print data is spooled in an RAW format, in place of an EMF format.

Figure 10:
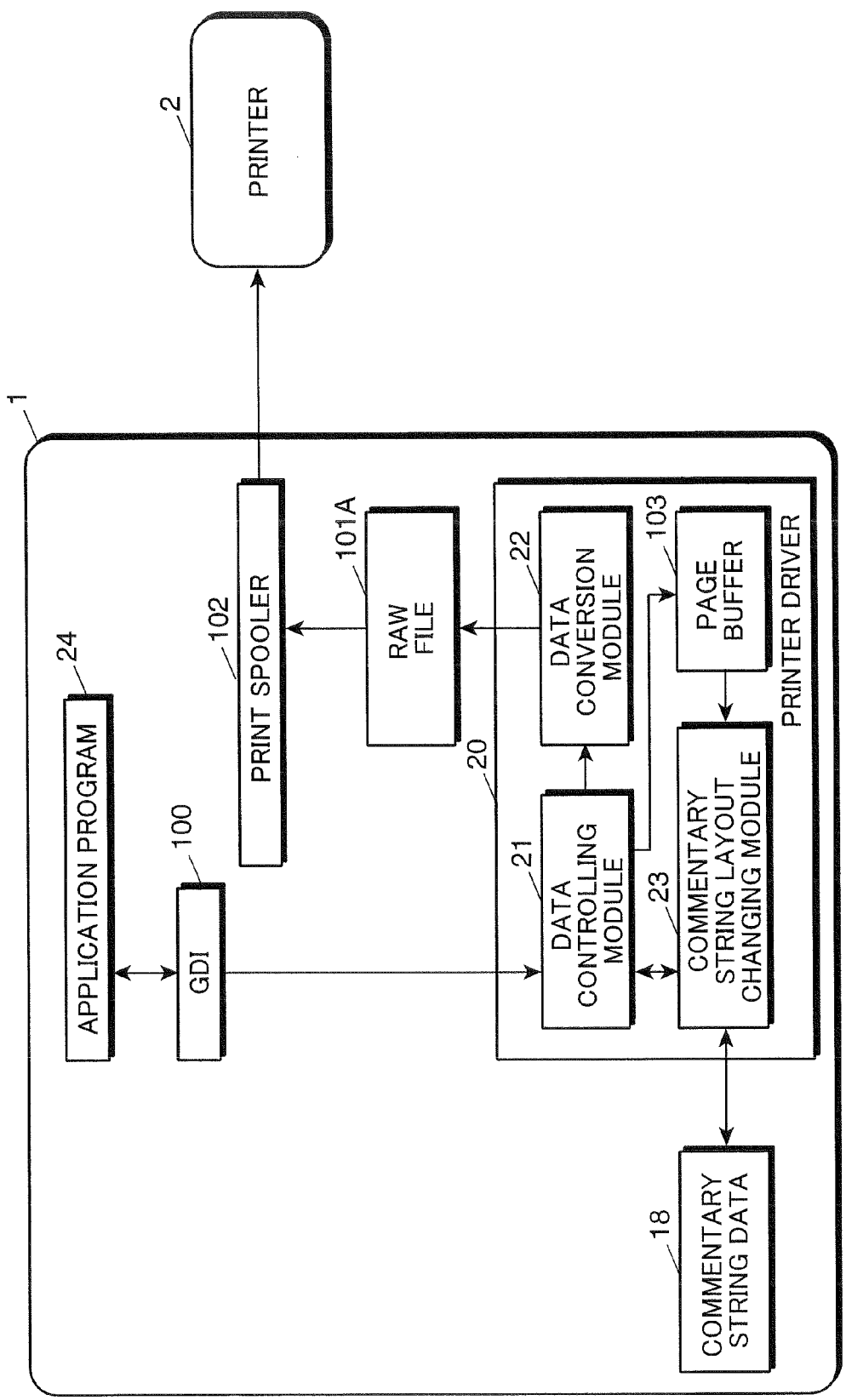
FIG. 10 is a functional block diagram showing primary elements of an image forming system as a second embodiment of the invention.

FIG. 10 is a functional block diagram schematically showing the image forming system in accordance with the second embodiment.

Similarly to the first embodiment, after a print setting is designated on a print dialog box 30, a print setting dialog box 32, and a header/footer print dialog box 40, the user is allowed to depress the print button 61 shown in FIG. 2. An operation to be executed by the image forming system until the contents of print data is formed on a recording sheet in response to user's depressing the print button 61 is described referring to the functional block diagram shown in FIG. 10.

In response to user's depressing the print button 61, an application program 24 calls a function of a GDI 100 in correspondence to document data created by the application program 24, and hands the document data to the function i.e. converts the document data into a GDI rendering command.

The function of the GDI 100 is operative to convert the GDI rendering command to a rendering command i.e. a DDI command interpretable by a printer driver 20, and sequentially hand the command data to the printer driver 20.

Upon receiving the command data, the printer driver 20 calls a data controlling module 21 in the printer driver 20.

In response to the calling, the data controlling module 21 hands, to a data conversion module 22, the command data which has been converted and sequentially outputted to the printer driver 20, as print data, and stores the print data into a page buffer 103. The data controlling module 21 also judges whether a statement of the data indicates pagination in handing the print data to the data conversion module 22. If the judgment result is affirmative, the data controlling module 21 reads out driver setting data, and judges whether the readout driver setting data includes commentary string data 18. Then, if it is judged that the readout driver setting data includes the commentary string data 18, the data controlling module 21 calls a commentary string layout changing module 23 before handing the pagination statement to the data conversion module 22.

In response to the calling, the commentary string layout changing module 23 interprets one-page print data to be stored in the page buffer 103, changes the layout of the commentary string data 18, if the following predetermined condition is satisfied, in a similar manner as the first embodiment, and hands the layout-changed commentary string data 18 to the data controlling module 21.

In response to the handing operation, similarly to the case that the data controlling module 21 has received the print data, the data controlling module 21 hands the commentary string data 18 to the data conversion module 22, and then hands the pagination statement to the data conversion module 22. By this control, the commentary string data 18 is attached to the print data before pagination. Thereafter, the aforementioned operation is repeated with respect to print data corresponding to the remaining pages to be sequentially outputted from the function of the GDI 100 after the pagination statement is issued.

The data conversion module 22 converts the data outputted from the data controlling module 21 into a PDL language interpretable by a printer 2, and stores the PDL data as an RAW file 101A in an RAM 12 or a spool area on an HDD 14.

A print spooler 102 is operative to check whether the printer 2 is in a printable condition by performing a background operation, and transmit the RAW file 101A stored in the spool area to the printer 2 via an interface section 11 and a communication port 17 upon confirming that the printer 2 is in a printable condition.

The printer 2 is operative to interpret the RAW file 101A transmitted from the print spooler 102, and develop one-page print data including a commentary string layer, layer by layer, into bitmap data for synthesis. Thereafter, the printer 2 is operative to form an electrostatic latent image on a photosensitive drum of a printer engine based on the synthesized data, develop the latent image into a toner image, and transfer the toner image onto a recording sheet, followed by image fixation and sheet discharge.

The first embodiment or the second embodiment may include the following modifications.

For instance, the printer 2 may be a part of a complex machine having a printer function, as far as the printer 2 has a printer function.

The communication port 17 is not limited to a USB port or a parallel port, but may be a port adapted for communication such as a serial port or an SCSI port.

The recording medium of the printer driver 2 is not limited to the HDD 14, a Floppy Disk®, a CD-ROM, or an HDD of a server computer, but may be an externally attachable HDD, a flash memory, an MD, an SD card, or a CF card.

In the foregoing embodiments, the commentary string layout changing module 23 causes the CPU 10 of the computer 1 to perform the operations. Alternatively, the commentary string layout changing module 23 may be stored in an HDD of the printer 2 to cause a CPU of the printer 2 to perform the operations.

Figure 1:
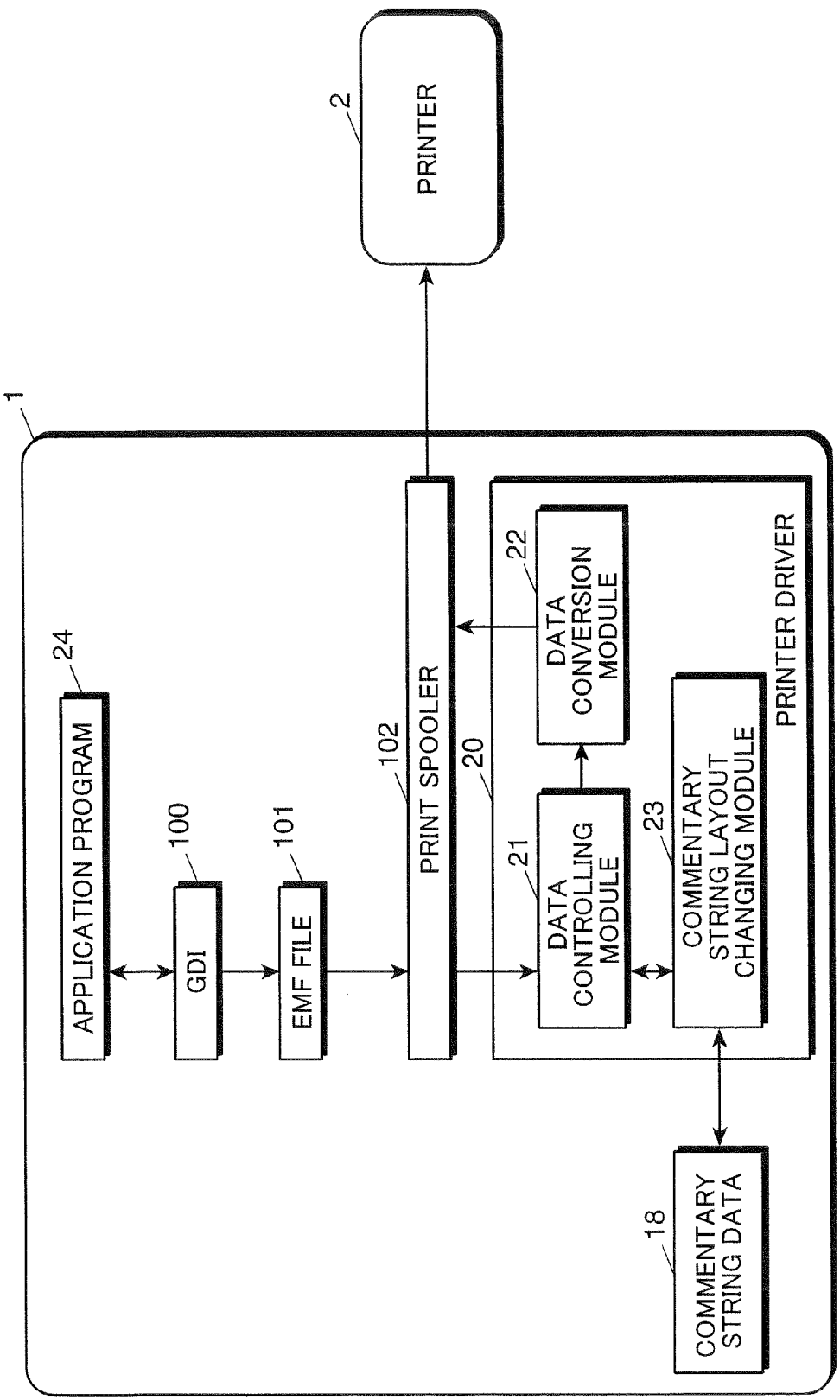
FIG. 1 is a functional block diagram showing primary elements of an image forming system to which the invention is applied.

The functional block diagram of FIG. 1 described in the first embodiment or the functional block diagram of FIG. 10 described in the second embodiment is a mere example based on a premise that the OS is Windows®. Alternatively, other configuration based on the premise that the OS is Windows® may be applicable. Further alternatively, other configuration based on a premise that the OS is Linux® may be applicable.

In the first embodiment, the image forming system is so configured that print data is spooled in an EMF format, and in the second embodiment, the image forming system is so configured that print data is spooled in an RAW format. Alternatively, the image forming system may be so configured that print data is not spooled.

In the foregoing embodiments, the printer 2 is a PDL compatible printer. Alternatively, the printer 2 may be a host-based printer i.e. a dumb printer. In the modification, unlike the embodiments that the printer 2 is operative to synthesize print data and commentary string data, the printer driver 20 is operative to develop print data and commentary string data into bitmap data, followed by synthesis. In the modification, after development into bitmap data, the commentary string layout changing module 23 may perform commentary string shifting or the like.

The flowchart shown in FIG. 5 is a mere example of an operation to be executed by the commentary string layout changing module 23. In particular, the order of shifting and size reduction may be reversed.

In the case where print magnification information to be inputted from the interactive input device 15 indicates enlargement of a targeted rendering area, the commentary string layout changing module 23 may have a function of enlarging print data before a primary rendering area and a sub rendering area are calculated so as to enlarge the primary rendering area without enlarging the sub rendering area.

In the foregoing embodiments, the printer driver 20 has the data controlling module 21, the data conversion module 22, and the commentary string layout changing module 23 so that the modules 21, 22, and 23 perform the operations individually. Alternatively, a printing program such as the printer driver 20 or other module may perform the entirety or a part of the operations to be executed by the modules 21, 22, and 23.

Third Embodiment

The first and the second embodiments are so configured as to suppress loss of text information and commentary string information without reducing the print size of the text by shifting the commentary string or reducing the size of the commentary string. The arrangements of the first and the second embodiments, however, may have a drawback that an unduly large shifting or an unduly large size reduction of an exceedingly long commentary string makes it difficult to recognize the commentary string.

In view of the above, in the third embodiment, a commentary string layout changing module 23 is operative to divide a commentary string to be printed into two rows to secure visual recognition.

In the following, there is described an approach of dividing a commentary string into two rows by the commentary string layout changing module 23.

The hardware configuration and the system configuration of an image forming system in accordance with the third embodiment are identical to those described in the first embodiment.

Figure 11:
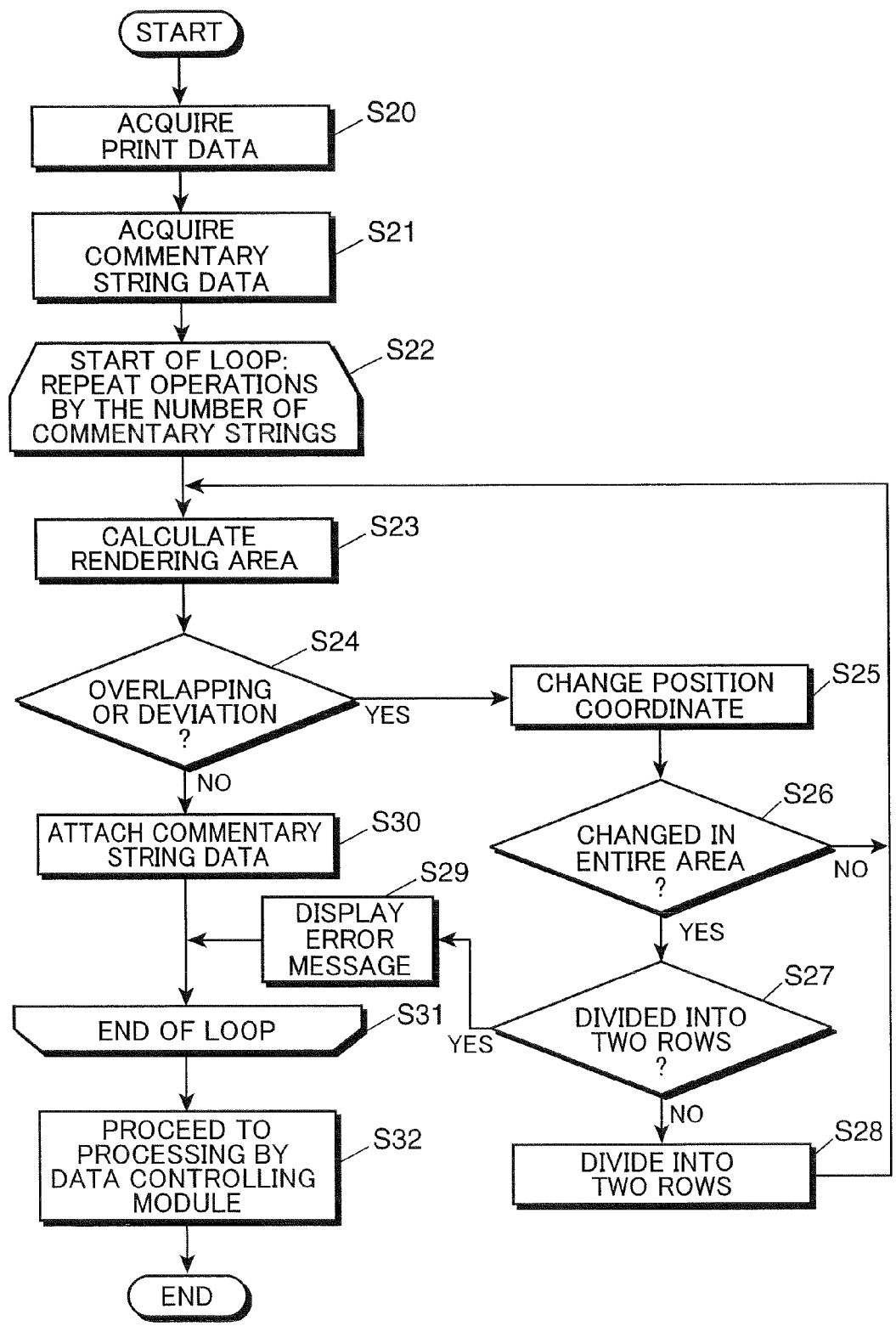
FIG. 11 is a flowchart showing an operation to be executed by a commentary string layout changing module in the second embodiment.

FIG. 11 is a flowchart showing an operation to be executed by a CPU 10 in accordance with the commentary string layout changing module 23 in the third embodiment. The flowchart of FIG. 11 is described in the order of Steps S20 through S32.

In Steps S20 through S23, the same operations as those in Steps S1 through S4 in FIG. 5 described in the first embodiment are performed.

In Step S24, the CPU 10 judges whether a primary rendering area and a sub rendering area overlap each other, judges whether multiple sub rendering areas overlap each other, and judges whether at least a part of the sub rendering area i.e. the entirety or a part of the sub rendering area is deviated from an effective printing area 62 by performing a graphic logical AND operation. If the judgment result is affirmative, in other words, if it is judged that overlapping or deviation has occurred, the routine proceeds to Step S25. If, on the other hand, the judgment result is negative, the routine proceeds to Step S30.

In Step S25, similarly to Step S6 in FIG. 5 described in the first embodiment, the CPU 10 changes the position coordinate of the commentary string to shift the targeted commentary string to be printed.

In Step S26, the CPU 10 judges whether the position coordinate of the commentary string is changed within the entirety of the effective printing area 62. If the judgment result is affirmative, the routine proceeds to Step S27. If, on the other hand, the judgment result is negative, the routine returns to Step S23.

In Step S27, the CPU 10 judges whether the targeted commentary string represented by the commentary string data 18 has already been divided into two rows. If the judgment result is affirmative, the routine proceeds to Step S29. If, on the other hand, the judgment result is negative, the routine proceeds to Step S28.

In Step S28, the CPU 10 divides the targeted commentary string represented by the commentary string data 18 into two rows, and then, the routine returns to Step S23. Any dividing approach may be used. In the third embodiment, for instance, the commentary string is divided into a former half part and a latter half part, and the commentary string data 18 is changed in such a manner that the latter half part is located at a lower row relative to the former half part. Both a one-byte character and a double-byte character are counted as one character. If the number of total characters constituting the commentary string is the odd number, in other words, if the commentary string is not divided into two parts evenly, the commentary string is divided in such a manner that the number of characters constituting the former half part is larger than the number of characters constituting the latter half part by one.

In Steps S29 through S32, the same operations as those in Steps S10 through S13 in FIG. 5 described in the first embodiment are performed.

Figure 12:
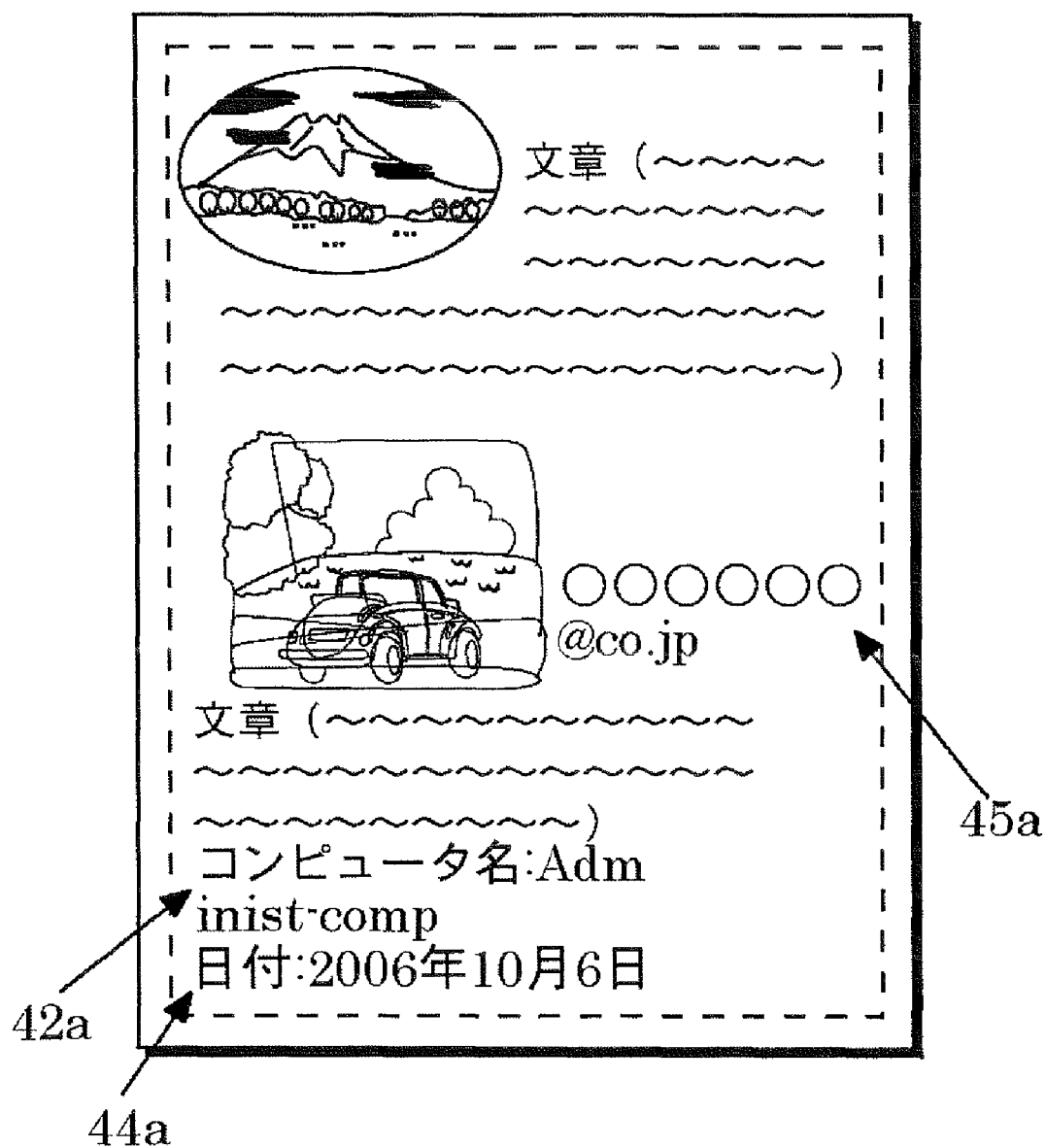
FIG. 12 is a diagram showing a print result to be obtained in the case where the second embodiment is applied.

If print data attached with the commentary string data 18 is printed on a recording sheet by using the approach of attaching commentary string data recited in the background art, a print result as shown in FIG. 7B is obtained. By using the approach recited in the third embodiment, a print result as shown in FIG. 12 is obtained.

The features of the third embodiment other than the above are the same as in the first embodiment.

In the third embodiment, the commentary string data is changed to shift the targeted commentary string in such a manner that the primary rendering area and the sub rendering area overlap each other, the entirety of the sub rendering area is located within the effective printing area 62 of a recording sheet, and multiple sub rendering areas do not overlap each other, if multiple commentary strings are to be printed; and the commentary string is divided into two rows if the shifting may result in overlapping or deviation. This is advantageous in preventing loss of text information and commentary string information without reducing the print size of the text.

The third embodiment may include the following modifications.

For instance, a step of reducing the size of a commentary string e.g. Step S8 and Step S9 in FIG. 5 described in the first embodiment may be included before Step S29 shown in FIG. 11.

The flowchart shown in FIG. 11 is a mere example of an operation to be executed by the commentary string layout changing module 23. In particular, the order of shifting and dividing may be reversed.

Fourth Embodiment

FIG. 13A is a diagram showing print results obtained by shifting a commentary string or reducing the size thereof with respect to a rendering area of one-page print data, as the primary rendering area, by using the commentary string layout changing module 23 of the first embodiment. The hatched areas in FIG. 13A show the primary rendering areas.

As shown in FIG. 13A, in the first embodiment, a commentary string is shifted or the size thereof is reduced with respect to a primary rendering area of one-page print data, page by page. In this arrangement, in the case where print data corresponding to multiple pages are included in the EMF file 101, in other words, in the case where a document to be printed is constituted of multiple pages, the position and the size of commentary string may be different one from the other throughout all the pages.

In other words, in the first embodiment, as shown in FIG. 13A, a judgment is made as to whether a sub rendering area is to be shifted or the size thereof is to be reduced with respect to each page. This may impair integrity on the position and the size of commentary string throughout all the pages.

The second and the third embodiment may have the same drawback as described above.

In view of the above, in the fourth embodiment, a commentary string layout changing module 23 is operative to secure integrity on the position and the size of commentary string by calculating a rendering area to be obtained in printing all the pages one over the other, as a primary rendering area. In this embodiment, the rendering area to be obtained in printing all the pages one over the other is a rendering area to be obtained by performing a logical sum operation with respect to primary rendering areas of the respective pages.

FIG. 13B is a diagram showing a rendering area to be obtained in printing all the pages shown in FIG. 13A one over the other. The rendering area to be obtained in printing all the pages shown in FIG. 13A one over the other is indicated by e.g. the hatched area shown in FIG. 13B.

In the following, an operation to be executed by a CPU 10 in accordance with the commentary string layout changing module 23 in the fourth embodiment is described referring to FIG. 5. In the fourth embodiment, the EMF file 101 includes print data of multiple pages.

In Step S1, the CPU 10 acquires the EMF file 101, in other words, print data corresponding to all the pages to be printed.

In Step S2, the CPU 10 acquires commentary string data 18 including character information; and rendering information such as position information and formatting information relating to the character information e.g. font or font size.

In Step S3, the CPU 10 repeats the operations from Step S4 to Step S12 by the number of commentary strings to be attached.

In Step S4, the CPU 10 calculates a rendering area of print data corresponding to each page as shown in FIG. 13A, based on the acquired EMF file 101 to obtain a graphic logical sum of all the rendering areas, and stores the calculated rendering area into an RAM 12 as a primary rendering area i.e. the hatched area shown in FIG. 13B. The CPU 10 also calculates a rendering area of the commentary string data 18 based on the commentary string data 18, and stores the calculated rendering area into the RAM 12 as a sub rendering area. The rendering area to be calculated is e.g. an area obtained by approximating each of rendering objects such as character strings, vector graphics objects, and images to a rectangular area. In the case where print magnification information indicating a print magnification is inputted by way of an input device 15, the CPU 10 calculates the rectangular areas of the primary rendering area and the sub rendering area, considering the magnification.

In Step S5, the CPU 10 judges whether the primary rendering area and the sub rendering area overlap each other, judges whether multiple sub rendering areas overlap each other, and judges whether at least a part of the sub rendering area i.e. the entirety or a part of the sub rendering area is deviated from an effective printing area 62 by performing a graphic logical AND operation. If the judgment result is affirmative, in other words, if it is judged that overlapping or deviation has occurred, the routine proceeds to Step S6. If, on the other hand, the judgment result is negative, the routine proceeds to Step S11.

In Steps S6 through S13, the same operations as those in Steps S6 through S13 described in the first embodiment are performed.

In the case where a primary rendering area and a sub rendering area overlap each other or a like condition, in response to calling of the commentary string layout changing module 23 by a data controlling module 21 in issuing a pagination statement included in print data for the first time, the commentary string layout changing module 23 changes the commentary string data 18. However, in the case where the commentary string layout changing module 23 is called in issuing a pagination statement thereafter, the commentary string data 18 has already been changed at the first calling to prevent overlapping of the rendering area to be obtained in printing all the pages one over the other, and the rendering area of the commentary string, or a like drawback. Accordingly, there is no need of changing the commentary string data 18, once the commentary string data 18 is changed.

Specifically, after the control flow shown in FIG. 5 is executed, and the commentary string data 18 is changed, if the control flow shown in FIG. 5 is executed again, there is no likelihood that the judgment result of Step S5 in FIG. 5 is affirmative. This arrangement enables to use the same commentary string data 18 throughout all the pages, which is advantageous in integrating the position and the size of commentary string.

Thus, the arrangement is advantageous in securing integrity on the position and the size of commentary string throughout all the pages, and in suppressing loss of text information and commentary string information without reducing the print size of the text.

In the first, the second, and the third embodiments, the print results as shown in FIG. 13A are obtained. On the other hand, in the fourth embodiment, a print result as shown in FIG. 14 is obtained, because the commentary string data 18 is changed to integrate the position and the size of commentary string throughout all the pages.

It is highly likely that a rendering area to be obtained in printing all the pages one over the other i.e. a primary rendering area may be increased, as compared with the rendering area to be obtained in printing one-page print data page by page. As a result, the commentary string may be excessively shifted, or the size thereof may be excessively reduced to prevent overlapping with the primary rendering area. In view of this, in the fourth embodiment, as shown in FIG. 15, the user is allowed to select whether integrity on the position and the size of commentary string is to be secured throughout all the pages by a checkbox 200 in a header/footer print dialog box 40a. If the checkbox 200 is checked, the commentary string layout changing module 23 is operative to calculate the rendering area to be obtained in printing all the pages one over the other, as a primary rendering area. If the checkbox 200 is not checked, the commentary string layout changing module 23 is operative to calculate a rendering area of one-page print data, as a primary rendering area.

The features of the fourth embodiment other than the above are the same as in the first embodiment.

Alternatively, the arrangement of the fourth embodiment may be applied to the flowchart of FIG. 11 described in the third embodiment.

In the fourth embodiment, the commentary string data 18 is changed to shift the commentary string, reduce the size thereof, or divide the commentary string into two rows in such a manner that the rendering area to be obtained in printing all the pages one over the other i.e. a primary rendering area, and the rendering area of the commentary string data 18 i.e. a sub rendering area do not overlap each other; the entirety of the sub rendering area is located within the effective printing area 62 of a recording sheet; and multiple sub rendering areas do not overlap each other, if multiple commentary strings are to be printed. This is advantageous in securing integrity on the position and the size of commentary string throughout all the pages, and preventing loss of text information and commentary string information without reducing the print size of the text.

Fifth Embodiment

In the first through the fourth embodiments, the commentary string layout changing module 23 causes the CPU 10 to shift the commentary string within the effective printing area 62. As a result of shifting the commentary string, an unwanted print result may be obtained, because the commentary string is attached to a position other than the expected print positions designated by the user by way of the selection boxes 41 through 45 shown in FIG. 4 or FIG. 15 (see FIG. 8B or FIG. 12).

In view of the above, in the fifth embodiment, predetermined areas corresponding to print positions designatable by the user are defined as a movable range of a commentary string to prevent loss of text information and commentary string information, and to prevent generation of an unwanted print result.

The hardware configuration and the system configuration of an image forming system in accordance with the fifth embodiment are identical to those described in the first embodiment.

Figure 16:
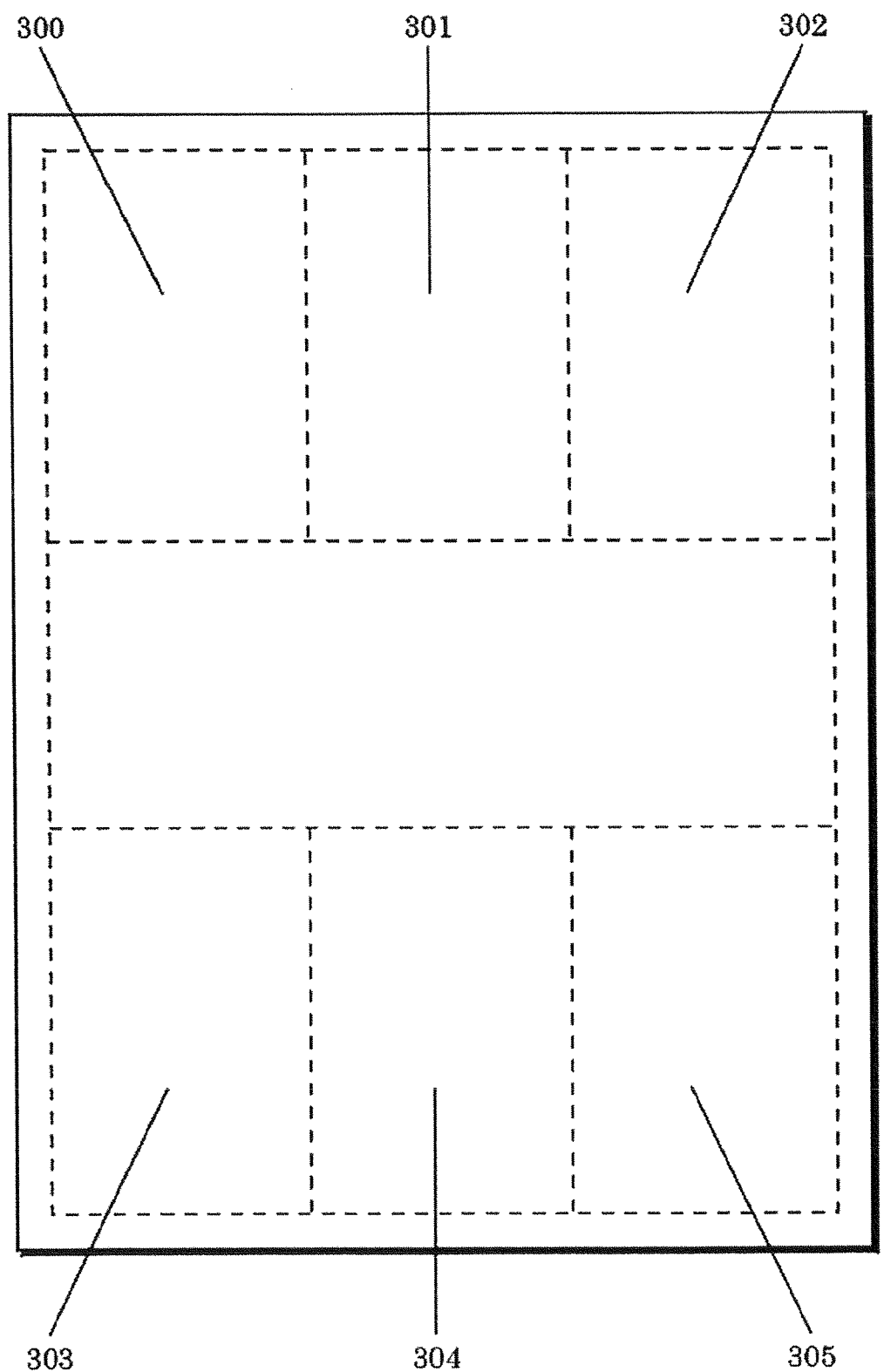
FIG. 16 is a diagram showing printable areas corresponding to print positions designatable by a user.

FIG. 16 is a diagram showing areas corresponding to print positions designatable by the user. In the fifth embodiment, the movable range of a commentary string in the case where the upper left position 46, the upper middle position 47, the upper right position 48, the lower left position 49, the lower middle position 50, or the lower right position 51 is selected as a print position by the selection boxes 41 through 45 shown in FIG. 4, is defined as a printable area 300, 301, 302, 303, 304, or 305, respectively.

For instance, in the case where the upper left position 46 is selected as a print position, and commentary string data 18 includes position coordinate information of a commentary string corresponding to the upper left position 46, a commentary string layout changing module 23 in the fifth embodiment causes a CPU 10 to perform the operations shown in FIG. 5 except for the following. Specifically, in the fifth embodiment, in Step S7, the position coordinate of a targeted commentary string e.g. the upper left apex coordinate of a rectangular frame including the commentary string is shifted within the printable area 300 corresponding to the upper left print position 46 by a pitch of e.g. 1 mm; and in Step S8, judgment is made as to whether the position coordinate has been changed in the entirety of the printable area 300.

In the fifth embodiment, the printable area corresponding to the print position designated by the user is defined as the movable range of the commentary string. This is advantageous in preventing loss of text information and commentary string information, and preventing generation of an unwanted print result.

The fifth embodiment may include the following modifications.

The aforementioned movable range of the position coordinate is merely an example. For instance, in the case where the upper left print position 46 is selected by the selection boxes 41 through 45, the position coordinate may be changed within a printable area including the printable areas 300, 301, and 302.

The arrangement of the fifth embodiment is not only applied to the arrangement of the first embodiment, but may also be applicable to the arrangements of all the other embodiments.

Sixth Embodiment

In the first through the fifth embodiments, in the case where multiple commentary strings are designated for printing by the selection boxes 41 through 45 shown in FIG. 4 or FIG. 15, printing may be performed in a state that a text and a commentary string overlap each other because of lack of an area for arranging at least one of the commentary strings, and the text or the other commentary string without overlapping. As a result of the overlapping, the commentary string information may be lost, in other words, print quality may be degraded.

In the sixth embodiment, a modified arrangement of the first embodiment is described to prevent loss of commentary string information which is deemed to be important to the user.

The hardware configuration and the system configuration of an image forming system in accordance with the sixth embodiment are identical to those described in the first embodiment.

FIG. 17 is a diagram showing a header/footer print dialog box 40b in the sixth embodiment.

Selection boxes 310, 311, 312, 313, and 314 are provided in the middle between indications on the kinds of commentary string, and selection boxes 41, 42, 43, 44, and 45 within the header/footer print dialog box 40b. The user is allowed to select the commentary strings in the order of priority of shifting the commentary strings by way of the selection boxes 310 through 314. In response to user's depressing an OK button 58, selected contents is determined as part of commentary string data 18.

Since the selection boxes 310 through 314 are provided independently of each other, the same shifting priority may be set to the multiple commentary strings. In order to avoid such a drawback, in determining the commentary string data 18 in response to user's depressing the OK button 58, the shifting priority is changed in such a manner as to prevent setting of the same shifting priority to the commentary strings. For instance, in the header/footer print dialog box 40b shown in FIG. 17, shifting of a commentary string, whose print position is upper relative to the other commentary strings having the same shifting priority, is determined at first, and then, the shifting priority of the other commentary strings is changed to a lower priority accordingly.

A commentary string layout changing module 23 in the sixth embodiment causes a CPU 10 to perform the operations shown in FIG. 5 except for the following. The operations from Step S4 through Step S11 are performed in the order of commentary string data 18 having a higher shifting priority over the other commentary string data.

In the sixth embodiment, the user is allowed to select the priority of shifting the commentary strings in the manner as described above. In this arrangement, even in a condition that an area for arranging all the texts and commentary strings without overlapping is not secured within an effective printing area 62, a commentary string having a higher shifting priority is shifted prior to the other commentary strings. This is advantageous in suppressing print failure that a commentary string having a higher shifting priority i.e. a commentary string which is deemed to be important to the user may be lapped over the other image, or deviated from the effective printing area 62.

The arrangement of the sixth embodiment is not only applied to the arrangement of the first embodiment, but may also be applicable to the arrangements of all the other embodiments.

Seventh Embodiment

In the first through the sixth embodiments, immediately after the commentary string data 18 is attached to the print data, the print data attached with the commentary string data 18 is transmitted to the printer 2 by the print spooler 102 to start printing. In this arrangement, an unwanted print result may be obtained, because the user is only allowed to check the print contents after the commentary string data 18 is attached to the print data after the printing is completed.

In view of the above, in the seventh embodiment, described is a modified arrangement of the first embodiment that enables to prevent loss of text information and commentary string information and secure a print result as intended by the user. The arrangement of the seventh embodiment is advantageous in eliminating repeated commentary string setting and printing, thereby enabling to eliminate user's additional operation and save recording sheets.

The hardware configuration and the system configuration of an image forming system in accordance with the seventh embodiment are identical to those described in the first embodiment.

Figure 18:
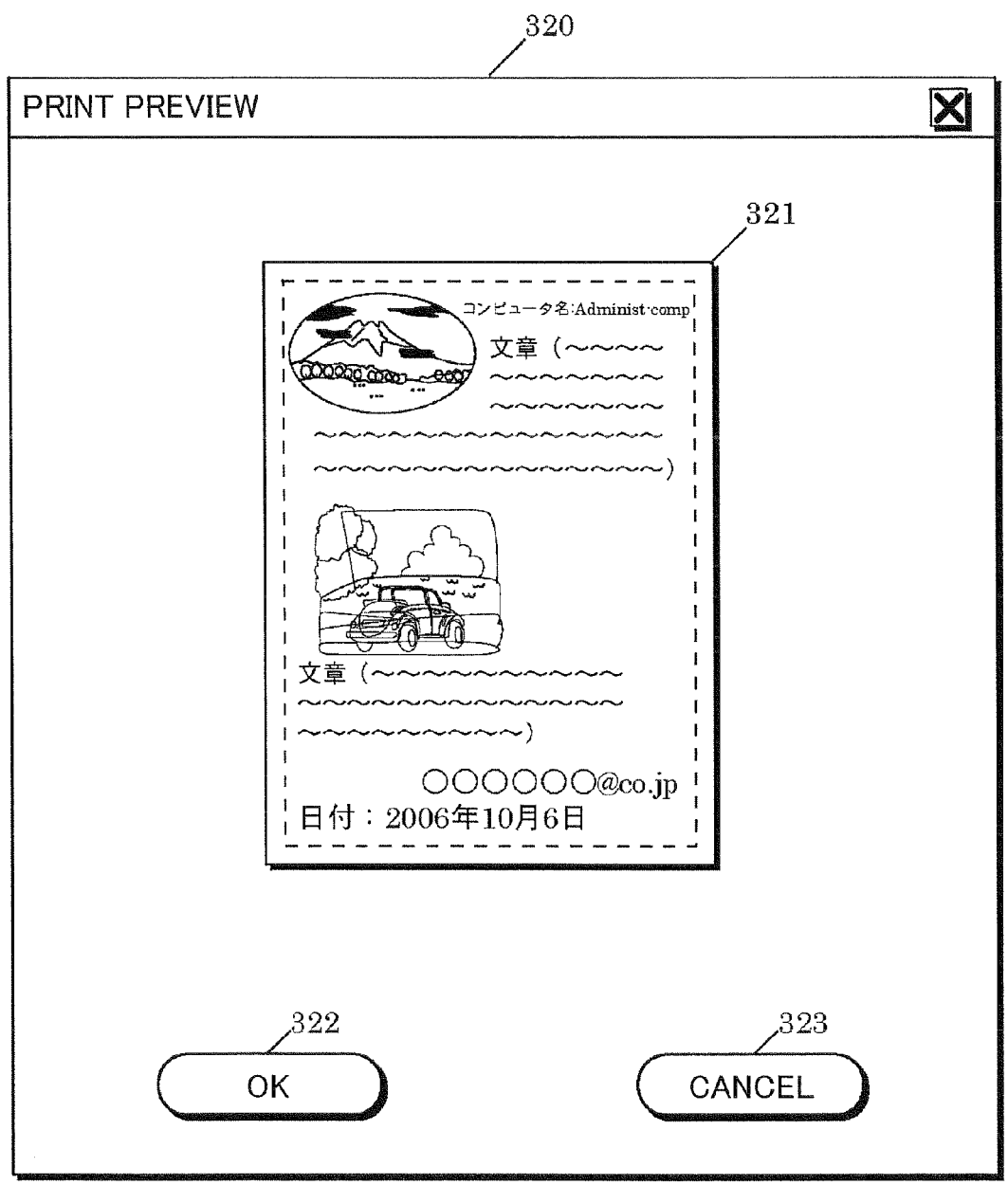
FIG. 18 is a diagram showing a print preview dialog box to be displayed on the screen of the display device.

A commentary string layout changing module 23 in the seventh embodiment causes a CPU 10 to perform the operations shown in FIG. 5 except for the following. Specifically, in the seventh embodiment, in Step S13, prior to proceeding to the operation by a data controlling module 21, a print preview dialog box 320 as shown in FIG. 18 is displayed on a screen of a display device 16 to allow the user to select whether the printing is to be continued.

When the print preview dialog box 320 is opened, a print preview image 321 showing the print contents including commentary string data 18, an OK button 322, and a cancel button 323 are displayed. In response to user's depressing the Ok button 322, the operation is continued. In this example, the CPU 10 judges that the OK button 322 is depressed to print the succeeding page and thereafter. Then, printing by a printer 2 is started. In response touser's depressing the cancel button 323, the operation is suspended, and the header/footer print dialog box 40 shown in FIG. 4 is displayed on the screen of the display device 16.

In the seventh embodiment, before the CPU 10 proceeds from Step S12 to Step S13, and execution of the data controlling module 21 is started, the print preview dialog box 320 is displayed to allow the user to determine whether the operation is to be continued. This is advantageous in preventing loss of text information and commentary string information, and securing a print result as intended by the user.

The seventh embodiment may include the following modifications.

For instance, in the seventh embodiment, the print preview image 321 corresponding to one-page print data is displayed. Alternatively, the print preview image 321 may also include print data of the succeeding page and thereafter.

In the seventh embodiment, the commentary string layout changing module 23 causes the CPU 10 to display the print preview dialog box 320 before the routine proceeds to the operation by the data controlling module 21. Alternatively, the print preview dialog box 320 may be displayed before print data is transmitted to the printer 2. For instance, the data controlling module 21 may call the commentary string layout changing module 23 to display the print preview dialog box 320 after the control is shifted from the operation by the commentary string layout changing module 23 to the operation by the data controlling module 21, and before the print data is transmitted from the print spooler 102 to the printer 2.

In the seventh embodiment, the commentary string layout changing module 23 is operative to display the print preview dialog box 320. Alternatively, a printing program such as a printer driver 20 or other module may be operative to display the print preview dialog box 320.

The arrangement of the seventh embodiment is not only applied to the arrangement of the first embodiment, but may also be applicable to the arrangements of all the other embodiments.

The following is a summary of the embodiments.

A computer-readable recording medium recorded with a printing program according to an aspect of the invention is a computer-readable recording medium recorded with a printing program which causes a processor of a computer to execute an operation of attaching commentary string data representing a commentary string to print data. The printing program causes the processor to execute: a first step of calculating a rendering area of the print data stored in a storing section of the computer as a primary rendering area based on the print data, and calculating a rendering area of the commentary string data to be attached to the print data as a sub rendering area based on the commentary string data; a second step of judging whether the primary rendering area and the sub rendering area overlap each other, and judging whether at least a part of the sub rendering area is deviated from an effective printing area; a third step of changing the commentary string data to edit the commentary string in such a manner that the primary rendering area and the sub rendering area do not overlap each other, and that the entirety of the sub rendering area is located within the effective printing area, if at least one of the judgment results in the second step is affirmative; and a fourth step of attaching the changed commentary string data to the print data.

In the above arrangement, the printing program is operative to change the commentary string data to edit the commentary string in such a manner that the rendering area of the print data as the primary rendering area, and the rendering area of the commentary string data as the sub rendering area do not overlap each other, and that the entirety of the sub rendering area is located within the effective printing area of a recording sheet. This is advantageous in suppressing loss of text information and commentary string information without reducing the print size of the text.

The printing program includes a printer driver, a printer driver module i.e. a plug-in module, and combination thereof. The arrangement that the processor executes the first through the fourth steps include an arrangement that the printer driver or the printer driver module executes all the steps, an arrangement that multiple printer driver modules individually execute the steps, and an arrangement that the printer driver and the printer driver module cooperatively execute the steps.

The commentary string data may include position information and formatting information other than character information on the commentary strings. The commentary string is not limited to a character string for elucidating the meaning of the text, but may include a character string having no relevancy to the text. The computer may include a computer incorporated in an image forming apparatus.

Preferably, the editing operation in the third step is at least one of an operation of shifting the commentary string, and an operation of reducing the size of the commentary string.

In the above arrangement, the printing program is operative to change the commentary string data to shift the commentary string or reduce the size of the commentary string in such a manner that the rendering area of the print data as the primary rendering area, and the rendering area of the commentary string data as the sub rendering area do not overlap each other, and that the entirety of the sub rendering area is located within the effective printing area of a recording sheet. This is advantageous in suppressing loss of text information and commentary string information without reducing the print size of the text.

Preferably, in the first step, a rendering area to be obtained in printing all pages one over the other is calculated as the primary rendering area based on the print data corresponding to all the pages, and the rendering area of the commentary string data is calculated as the sub rendering area based on the commentary string data, and the editing operation in the third step is at least one of an operation of shifting the commentary string, an operation of reducing the size of the commentary string, and an operation of dividing the commentary string into two rows.

In the above arrangement, the printing program is operative to change the commentary string data to shift the commentary string, reduce the size of the commentary string, or divide the commentary string into two rows in such a manner that the rendering area, as the primary rendering area, to be obtained in printing all the pages one over the other, and the rendering area of the commentary string data as the sub rendering area do not overlap each other, and that the entirety of the sub rendering area is located within the effective printing area of a recording sheet. This is advantageous in suppressing loss of text information and commentary string information without losing integrity on the position and the size of commentary string throughout all the pages and without reducing the print size of the text.

Preferably, in the third step, the commentary string data is changed to shift the commentary string so as to satisfy a condition that the primary rendering area and the sub rendering area do not overlap each other and that the entirety of the sub rendering area is located within the effective printing area, if at least one of the judgment results in the second step is affirmative; and the commentary string is divided into two rows if the processor is incapable of finding a print position of the commentary string that satisfies the condition.

In the above arrangement, if it is impossible to arrange the sub rendering area in such a manner as to satisfy the above condition by shifting the commentary string, the commentary string is divided into two rows. The two-row display of the commentary string is easily discernible to a viewer.

Preferably, the computer further includes an input section which accepts input of designation as to whether a print position of the commentary string is to be integrated with respect to all pages to be printed, and in the first step, a rendering area to be obtained in printing all the pages one over the other is calculated as the primary rendering area based on the print data corresponding to all the pages to be printed, and the rendering area of the commentary string data is calculated as the sub rendering area based on the commentary string data, if the input section accepts the designation of integrating the print position.

It is highly likely that the rendering area, as the primary rendering area, to be obtained in printing all the pages one over the other may be increased, as compared with the rendering area to be obtained in printing one-page print data page by page. As a result, the commentary string may be excessively edited by changing the commentary string data in such a manner that the rendering area, as the primary rendering area, to be obtained in printing all the pages, and the rendering area of the commentary string data as the sub rendering area do not overlap each other, and that the entirety of the sub rendering area is located within the effective printing area.

In the above arrangement, however, the user is allowed to input designation as to whether the print position of the commentary string is to be integrated with respect to all the pages to be printed. If the input section accepts the designation of integrating the print position, in the first step, the rendering area to be obtained in printing all the pages one over the other is calculated as the primary rendering area based on the print data corresponding to all the pages to be printed, and the rendering area of the commentary string data is calculated as the sub rendering area based on the commentary string data. This is advantageous in suppressing excessive editing of the commentary string in response to user's designation.

Preferably, in the first step, a rendering area of the print data corresponding to one page is calculated as the primary rendering area based on the one-page print data, and the rendering area of the commentary string data is calculated as the sub rendering area based on the commentary string data, and the editing operation in the third step is an operation of dividing the commentary string into two rows.

In the above arrangement, the printing program is operative to change the commentary string data to divide the commentary string into two rows in such a manner that the rendering area of one-page print data as the primary rendering area, and the rendering area of the commentary string data as the sub rendering area do not overlap each other, and that the entirety of the sub rendering are is located within the effective printing area of a recording sheet. This is advantageous in preventing loss of text information and commentary string information without reducing the print size of the text. Dividing a commentary string into two rows is a unique and novel idea.

Preferably, the commentary string is multiple commentary strings. In the second step, a further judgment is made as to whether the multiple sub rendering areas overlap each other, and in the third step, the commentary string data is changed to edit the commentary string in such a manner that the multiple sub rendering areas do not overlap each other, if the result of the further judgment in the second step is affirmative.

In the above arrangement, in the case where the commentary string is the multiple commentary strings, the printing program is operative to change the commentary string data to edit the commentary string in such a manner that the sub rendering areas do not overlap each other. This is advantageous in preventing loss of commentary string information.

Preferably, the computer further includes an input section which accepts input of a character string, and the commentary string includes the character string accepted by the input section.

Preferably, the computer further includes an input section which accepts input of print magnification information indicating a print magnification, and in the second step, the primary rendering area and the sub rendering area are calculated based on the print magnification information accepted by the input section.

In the above arrangements, the printing program is operative to calculate the primary rendering area and the sub rendering area, considering the print magnification information. This enables to prevent likelihood that at least a part of the commentary string may be deviated from the effective printing area resulting from enlargement of the commentary string based on the print magnification information, thereby preventing loss of commentary string information.

Preferably, the computer further includes an input section which accepts input of print magnification information indicating a print magnification, and the print data is enlarged prior to the first step in such a manner that the primary rendering area is enlarged without enlarging the sub rendering area, if the print magnification information accepted by the input section indicates enlarging.

In the above arrangement, in the case where the print magnification information accepted by the input section of the computer indicates enlarging, the printing program is operative to enlarge the print data in such a manner that the primary rendering area is enlarged without enlarging the sub rendering area. This is advantageous in suppressing likelihood that at least a part of the commentary string may be deviated from the effective printing area resulting from enlargement of the commentary string based on the print magnification information, thereby suppressing loss of commentary string information.

Preferably, the editing operation in the third step is at least one of an operation of shifting the commentary string, an operation of reducing the size of the commentary string, and an operation of dividing the commentary string into two rows.

Preferably, the dividing operation is an operation of changing the commentary string data in such a manner that the commentary string of one row represented by the commentary string data is displayed in two rows.

In the above arrangements, if it is impossible to secure an area for printing the commentary string in one row, the commentary string is displayed in two rows. This is advantageous in arranging the commentary string free of overlapping of the primary rendering area and the sub rendering area and deviation of the sub rendering area from the effective printing area, without unduly reducing the size of the commentary string.

Preferably, in the dividing operation, the commentary string is evenly divided into two rows, if the number of characters of the commentary string represented by the commentary string data is divided by two, and the commentary string is divided in such a manner that the number of characters in the first row is larger than the number of characters in the second row by one, if the number of characters of the commentary string represented by the commentary string data is not divided by two.

In the above arrangement, the commentary string is printed in two rows in such a manner that the number of characters in the first row is identical to the number of characters in the second row, if the number of characters of the commentary string is divided by two. This provides sophisticated layout. Further, the commentary string is printed in two rows in such a manner that the number of characters in the first row is larger than the number of characters in the second row by one, if the number of characters of the commentary string is not divided by two. Displaying the first row with the number of characters slightly larger than the second row provides sophisticated layout.

A computer-readable recording medium recorded with a printing program according to another aspect of the invention is a computer-readable recording program recorded with a printing program to be installed in a storing section of a computer provided with a processor, an input section, a display section, the storing section, and a temporary storage for storing print data, commentary string data representing a commentary string, and position information on the commentary string. The printing program causes the processor to execute, before the processor accepts a print start designation accepted by the input section: a displaying step of displaying, on the display section, a screen for selecting a commentary string from the multiple commentary strings; an accepting step of accepting, on the screen, the selection by the input section; and a determining step of determining the accepted commentary string as a part of the commentary string data. The printing program further causes the processor to execute, after the processor accepts the print start designation: a shifting step of changing the position information of the commentary string data to shift the commentary strings in such a manner that a rendering area of the print data and a rendering area of the commentary string data do not overlap each other, and that the rendering areas of the commentary strings represented by the commentary string data do not overlap each other; and an attaching step of attaching the changed commentary string data to the print data.

In the above arrangement, the commentary string selected by the input section is shifted in such a manner that the rendering area of the print data and the rendering area of the commentary string data do not overlap each other, and that the rendering areas of the multiple commentary strings represented by the commentary string data do not overlap each other. This is advantageous in suppressing loss of a commentary string which is selected and deemed to be important to the user resulting from overlapping with the print data or the other commentary string, without reducing the print size of the text.

Preferably, the screen to be displayed in the displaying step is a screen for selecting one of the multiple commentary strings, and setting a priority of shifting the commentary strings. In the accepting step, the setting of the shifting priority of the selected commentary string is accepted, and in the shifting step, the position information of the commentary string data is changed based on the shifting priority setting accepted in the accepting step.

In the above arrangement, the commentary strings are shifted by the shifting priority accepted by the input section in such a manner that the rendering area of the print data and the rendering area of the commentary string data do not overlap each other, and that the rendering areas of the multiple commentary strings represented by the commentary string data do not overlap each other. This is advantageous in suppressing loss of commentary string information which is deemed to be important to the user, even if an area for arranging the commentary strings is not secured without overlapping with the other rendering area.

Preferably, in the accepting step, the printing program further causes the processor to execute a step of changing the shifting priority in such a manner that the shifting priority of the commentary string whose print position indicated by the position information is upper relative to the other commentary string is set higher than the other commentary string, if setting of the same shifting priority is accepted with respect to the multiple commentary strings.

In the above arrangement, if the setting of the same shifting priority is accepted with respect to the multiple commentary strings, it is possible to print the commentary string whose priority of print position indicated by the position information is higher than the other commentary string, in other words, the commentary string with a print position more appealing to a viewer than the other commentary string.

Preferably, in the displaying step, the display section further displays a screen for selecting a print position of the commentary string. In the accepting step, the input section further accepts selection of the print position. In the shifting step, the commentary string is shifted exclusively in a predetermined printable area corresponding to the print position accepted by the input section, the printable area being included in an effective printing area.

In the above arrangement, the commentary string data is changed to shift the commentary string within the printable area in the effective printing area, corresponding to the print position selected by the input section in such a manner that the rendering area of the print data and the rendering area of the commentary string dare do not overlap each other, and that the rendering areas of the multiple commentary strings represented by the commentary string data do not overlap each other. This is advantageous in suppressing loss of text information and commentary string information, and suppressing generation of an unwanted print result.

A computer-readable recording medium recorded with a printing program according to yet another aspect of the invention is a computer-readable recording medium recorded with a printing program to be installed in a storing section of a computer provided with a processor, an input section, a display section, the storing section, and a temporary storage for storing print data and commentary string data representing a commentary string. The printing program causes the processor to execute: a shifting step of changing the commentary string data to shift the commentary string in such a manner that a rendering area of the print data and a rendering area of the commentary string data do not overlap each other; a displaying step of displaying, on the display section, a print preview screen showing an image that the changed commentary string data is attached to the print data, after the shifting step is executed and before the print data is transmitted to an image forming apparatus; a transmission checking step of checking, on the print preview screen, whether transmission of the print data attached with the changed commentary string data is accepted by the input section; and a suspending step of suspending the transmission if the transmission is not accepted in the transmission checking step.

In the above arrangement, before the print data is transmitted to the image forming apparatus, the display section displays the print preview screen after the shifting step is executed in such a manner that the rendering area of the print data and the rendering area of the commentary string data do not overlap each other. It is checked, on the print preview screen, whether the input section has accepted transmission of the print data. If it is checked that the input section has not accepted the transmission, the transmission is suspended. This is advantageous in suppressing loss of text information and commentary string information, and suppressing generation of an unwanted print result.

This application is based on Japanese Patent Application No. 2007-006964, No. 2007-006965, and No. 2007-006966 filed on Jan. 16, 2007, the contents of which are hereby incorporated by reference.

Although the invention has been appropriately and fully described by way of examples with reference to the accompanying drawings, it is to be understood that various changes and/or modifications will be apparent to those skilled in the art. Therefore, unless otherwise such changes and/or modifications depart from the scope of the present invention hereinafter defined, they should be construed as being included therein.

What is claimed is:

1. A computer-readable recording medium recorded with a printing program, the printing program causing a processor of a computer to execute an operation of attaching commentary string data representing a commentary string to print data, the printing program causing the processor to execute:
    a first step of calculating a rendering area of the print data stored in a storing section of the computer as a primary rendering area based on the print data, and calculating a rendering area of the commentary string data to be attached to the print data as a sub rendering area based on the commentary string data;
    a second step of judging whether the primary rendering area and the sub rendering area overlap each other, and judging whether at least a part of the sub rendering area is deviated from an effective printing area;
    a third step of changing the commentary string data to edit the commentary string in such a manner that the primary rendering area and the sub rendering area do not overlap each other, and that the entirety of the sub rendering area is located within the effective printing area, if at least one of the judgment results in the second step is affirmative; and
    a fourth step of attaching the changed commentary string data to the print data.

2. The computer-readable recording medium according to claim 1, wherein
    the editing operation in the third step is at least one of an operation of shifting the commentary string, and an operation of reducing the size of the commentary string.

3. The computer-readable recording medium according to claim 1, wherein
    in the first step, a rendering area to be obtained in printing all pages one over the other is calculated as the primary rendering area based on the print data corresponding to all the pages, and the rendering area of the commentary string data is calculated as the sub rendering area based on the commentary string data, and
    the editing operation in the third step is at least one of an operation of shifting the commentary string, an operation of reducing the size of the commentary string, and an operation of dividing the commentary string into two rows.

4. The computer-readable recording medium according to claim 3, wherein
    in the third step, the commentary string data is changed to shift the commentary string so as to satisfy a condition that the primary rendering area and the sub rendering area do not overlap each other and that the entirety of the sub rendering area is located within the effective printing area, if at least one of the judgment results in the second step is affirmative; and the commentary string is divided into two rows if the processor is incapable of finding a print position of the commentary string that satisfies the condition.

5. The computer-readable recording medium according to claim 1, wherein
    the computer further includes an input section which accepts input of designation as to whether a print position of the commentary string is to be integrated with respect to all pages to be printed, and
    in the first step, a rendering area to be obtained in printing all the pages one over the other is calculated as the primary rendering area based on the print data corresponding to all the pages to be printed, and the rendering area of the commentary string data is calculated as the sub rendering area based on the commentary string data, if the input section accepts the designation of integrating the print position.

6. The computer-readable recording medium according to claim 1, wherein
    in the first step, a rendering area of the print data corresponding to one page is calculated as the primary rendering area based on the one-page print data, and the rendering area of the commentary string data is calculated as the sub rendering area based on the commentary string data, and
    the editing operation in the third step is an operation of dividing the commentary string into two rows.

7. The computer-readable recording medium according to claim 1, wherein
    the commentary string is multiple commentary strings,
    in the second step, a further judgment is made as to whether the multiple sub rendering areas overlap each other, and
    in the third step, the commentary string data is changed to edit the commentary string in such a manner that the multiple sub rendering areas do not overlap each other, if the result of the further judgment in the second step is affirmative.

8. The computer-readable recording medium according to claim 1, wherein
    the computer further includes an input section which accepts input of a character string, and
    the commentary string includes the character string accepted by the input section.

9. The computer-readable recording medium according to claim 1, wherein
    the computer further includes an input section which accepts input of print magnification information indicating a print magnification, and
    in the second step, the primary rendering area and the sub rendering area are calculated based on the print magnification information accepted by the input section.

10. The computer-readable recording medium according to claim 1, wherein
    the computer further includes an input section which accepts input of print magnification information indicating a print magnification, and
    the print data is enlarged prior to the first step in such a manner that the primary rendering area is enlarged without enlarging the sub rendering area, if the print magnification information accepted by the input section indicates enlarging.

11. The computer-readable recording medium according to claim 1, wherein
the editing operation in the third step is at least one of an operation of shifting the commentary string, an operation of reducing the size of the commentary string, and an operation of dividing the commentary string into two rows.

12. The computer-readable recording medium according to claim 11, wherein
the dividing operation is an operation of changing the commentary string data in such a manner that the commentary string of one row represented by the commentary string data is displayed in two rows.

13. The computer-readable recording medium according to claim 12, wherein
in the dividing operation, the commentary string is evenly divided into two rows, if the number of characters of the commentary string represented by the commentary string data is divided by two, and the commentary string is divided in such a manner that the number of characters in the first row is larger than the number of characters in the second row by one, if the number of characters of the commentary string represented by the commentary string data is not divided by two.

14. A computer-readable recording medium recorded with a printing program to be installed in a storing section of a computer provided with a processor, an input section, a display section, the storing section, and a temporary storage for storing print data, commentary string data representing a commentary string, and position information on the commentary string, the printing program causing the processor to execute, before the processor accepts a print start designation accepted by the input section:
a displaying step of displaying, on the display section, a screen for selecting a commentary string from the multiple commentary strings;
an accepting step of accepting, on the screen, the selection by the input section; and
a determining step of determining the accepted commentary string as a part of the commentary string data, the printing program further causing the processor to execute, after the processor accepts the print start designation:
a shifting step of changing the position information of the commentary string data to shift the commentary strings in such a manner that a rendering area of the print data and a rendering area of the commentary string data do not overlap each other, and that the rendering areas of the commentary strings represented by the commentary string data do not overlap each other; and
an attaching step of attaching the changed commentary string data to the print data.

15. The computer-readable recording medium according to claim 14, wherein
the screen to be displayed in the displaying step is a screen for selecting one of the multiple commentary strings, and setting a priority of shifting the commentary strings,
in the accepting step, the setting of the shifting priority of the selected commentary string is accepted, and
in the shifting step, the position information of the commentary string data is changed based on the shifting priority setting accepted in the accepting step.

16. The computer-readable recording medium according to claim 15, wherein
in the accepting step, the printing program further causes the processor to execute a step of changing the shifting priority in such a manner that the shifting priority of the commentary string whose print position indicated by the position information is upper relative to the other commentary string is set higher than the other commentary string, if setting of the same shifting priority is accepted with respect to the multiple commentary strings.

17. The computer-readable recording medium according to claim 14, wherein
in the displaying step, the display section further displays a screen for selecting a print position of the commentary string,
in the accepting step, the input section further accepts selection of the print position, and
in the shifting step, the commentary string is shifted exclusively in a predetermined printable area corresponding to the print position accepted by the input section, the printable area being included in an effective printing area.

18. A computer-readable recording medium recorded with a printing program to be installed in a storing section of a computer provided with a processor, an input section, a display section, the storing section, and a temporary storage for storing print data and commentary string data representing a commentary string, the printing program causing the processor to execute:
a shifting step of changing the commentary string data to shift the commentary string in such a manner that a rendering area of the print data and a rendering area of the commentary string data do not overlap each other;
a displaying step of displaying, on the display section, a print preview screen showing an image that the changed commentary string data is attached to the print data, after the shifting step is executed and before the print data is transmitted to an image forming apparatus;
a transmission checking step of checking, on the print preview screen, whether transmission of the print data attached with the changed commentary string data is accepted by the input section; and
a suspending step of suspending the transmission if the transmission is not accepted in the transmission checking step.

* * * * *